(12) United States Patent
Katsuranis

(10) Patent No.: US 9,836,192 B2
(45) Date of Patent: Dec. 5, 2017

(54) IDENTIFYING AND DISPLAYING OVERLAY MARKERS FOR VOICE COMMAND USER INTERFACE

(71) Applicant: Evan Glenn Katsuranis, West Sacramento, CA (US)

(72) Inventor: Evan Glenn Katsuranis, West Sacramento, CA (US)

(*) Notice: Subject to any disclaimer, the term of this patent is extended or adjusted under 35 U.S.C. 154(b) by 262 days.

(21) Appl. No.: 14/628,591

(22) Filed: Feb. 23, 2015

(65) Prior Publication Data
US 2015/0243288 A1    Aug. 27, 2015

Related U.S. Application Data

(60) Provisional application No. 61/944,364, filed on Feb. 25, 2014.

(51) Int. Cl.
| | |
|---|---|
| *G06F 3/033* | (2013.01) |
| *G06F 3/0484* | (2013.01) |
| *G06F 3/16* | (2006.01) |
| *G10L 25/48* | (2013.01) |
| *G10L 15/22* | (2006.01) |

(52) U.S. Cl.
CPC ........... *G06F 3/0484* (2013.01); *G06F 3/167* (2013.01); *G10L 25/48* (2013.01); *G10L 2015/223* (2013.01)

(58) Field of Classification Search
CPC .................................................. G06F 3/0484
USPC ....................................................... 715/716
See application file for complete search history.

(56) References Cited

U.S. PATENT DOCUMENTS

| | | | | |
|---|---|---|---|---|
| 5,818,423 A * | 10/1998 | Pugliese | ............. | G06F 3/04812 345/157 |
| 7,742,923 B2 | 6/2010 | Bickel et al. | | |
| 9,081,550 B2 | 7/2015 | Oz et al. | | |
| 9,471,333 B2 | 10/2016 | Roy | | |
| 2004/0010414 A1* | 1/2004 | Tahara | .................... | G10L 15/22 704/275 |
| 2008/0313570 A1* | 12/2008 | Shamma | ........... | G06F 17/30525 715/846 |
| 2009/0313581 A1* | 12/2009 | Martin | ................ | G06F 3/04892 715/827 |
| 2011/0210917 A1* | 9/2011 | LaFave | ............... | G06F 3/04845 345/160 |
| 2012/0176313 A1* | 7/2012 | Ryu | ................. | H04N 21/42203 345/158 |
| 2012/0185758 A1* | 7/2012 | Huang | ..................... | G09G 5/14 715/205 |
| 2012/0313849 A1* | 12/2012 | Bak | ......................... | G10L 15/08 345/156 |
| 2014/0313551 A1* | 10/2014 | Lyren | ..................... | H04N 1/387 358/1.18 |
| 2014/0372932 A1* | 12/2014 | Rutherford | ........... | G06F 17/246 715/776 |

(Continued)

*Primary Examiner* — Jason Olson
(74) *Attorney, Agent, or Firm* — Howard Sheerin

(57) ABSTRACT

The present invention is a computer-implemented system and method that lets users access, navigate, and control a computer desktop and applications, windows, menus, icons, text entry fields, buttons, check-boxes, drop-down lists and HTML links and all other objects on the computer desktop, including those that are normally inaccessible to accessibility programs on a graphical user interface in a windowed computing environment.

20 Claims, 21 Drawing Sheets

(56) References Cited

U.S. PATENT DOCUMENTS

2015/0058776 A1* 2/2015 Liu .................... G06F 3/04842
715/771
2016/0034253 A1 2/2016 Bang et al.

* cited by examiner

FIG. 21

IDENTIFYING AND DISPLAYING OVERLAY MARKERS FOR VOICE COMMAND USER INTERFACE

CROSS-REFERENCE TO RELATED APPLICATIONS

This claims priority to U.S. provisional patent application 61/944,364, filed 25 Feb. 2014, the contents of which are incorporated by reference to the extent not repeated herein.

FIELD OF USE

The present invention relates to graphical user interfaces ("GUIs") and, more particularly, to creating a mouse-free and touch free, user-customizable system and method that lets user easily and productively access, navigate and control all the screens, objects, and applications on computer devices such as desktop computers, laptop (or notebook) computers, smart phones, and tablets.

BACKGROUND

The present invention pertains to graphical user interfaces and, more particularly, to creating a user-customizable system and method to access, navigate and control the screens, objects and applications on computer devices (desktops, laptops, smart phones, tablets.) by inventing a new system and method that empowers computer users to enjoy easy and productive mouse-free and touch-free control of and access to their computers and all of their applications.

Computers commonly use a Graphical User Interface (GUI) to display various graphical interface objects on a display device. Examples of GUI objects are windows, menus, icons, text entry fields, buttons, check-boxes, drop-down lists and HTML links. Many of these objects can then be interacted with, acting as an interface for the computer and/or its currently running application.

As an example, consider an email client. The email client is made up of different objects contained in a Window. Within the email client the Window itself is a top level GUI object and can contains sub-objects such as a textbox object where a user can type an email message and a button object that the user can click on to send an email. Typically the user would identify the send button by a label object overlaid on top of the button objects which may read "send" or synonymous terms.

These GUI objects are typically arranged in a hierarchy resembling a tree like structure. The screen real estate of a monitor is typically abstracted as a desktop in which running applications can display any number of windows. Each window also typically consists of a hierarchy of controls such panes, buttons, labels, list items. GUI objects such as a button can also be hierarchical and can contain an image and a label.

Applications designed for a GUI use their windows and their associated hierarchy of GUI objects to facilitate user interaction. As the user moves a mouse or finger across a computer desktop (virtualized area representing the total available screen real estate), the operating system typically broadcasts this information in a way in which applications can take action based on the location of an input device. For example, if a user clicks on a button object in a window, the operating system will broadcast that a click took place at a specific location and the application in which the button was drawn under the cursor will be able to use that broadcasted information along with its internally represented hierarchy of objects to determine that a mouse click did occur over a button object and then act upon that information by performing an action. With this example it's important to note that an application can act upon a button being clicked even though the application responsible for drawing a mouse cursor and tracking its location, and even the operating system itself, have no idea there is a button at that location.

The above represents one way an application can link its underlying functions to its GUI and while the specifics differ from device to device and operating system to operating system, the underlying paradigm remains the same: The operating system, or high level application running on a computer device (such as the Windows Desktop Manager) does not need to be aware of what is displayed by an application or how it facilitates interaction with its display but is merely responsible for creating a set of rules by which the application can request the information it needs to accomplish those goals.

This describes how an immense number of mouse (or touch) intensive applications operate. Users can only control these applications by pointing and clicking the mouse, or by touching and tapping. Such applications range from home and auto loan applications, web pages, intranet sites, credit card forms and government eligibility forms to medical billing and Electronic Medical Records (EMRs). Such applications are heavily used by the more than twenty million clerical workers (Office and Administrative Support) in the US, "Office and Administrative Support Occupations", http://www.bls.gov/oes/current/oes430000.htm, May 2013. In addition, other professional workers frequently access databases, document management systems and websites in their work. For example, doctors are increasingly dependent on EMRs Many, if not most of these programs, are not accessible to users of speech recognition software and other accessibility software. An accessible program needs to fully communicate its internal representations of objects and details about how it can be interacted upon with other applications. This is typically done through an Accessibility Framework, which will be discuss in more detail shortly.

First, let's abstract this situation by considering all graphical objects in a GUI to belong to one or more of three hierarchies regardless of the device or operating system being used. There is the hierarchy maintained by the operating system and or accessibility frameworks (Hierarchy 1), the hierarchy maintained by the individual application (Hierarchy 2), and the visual hierarchy of controls observed visually by a sighted user with good vision (Hierarchy 3). In the above example of an email client the application's window was a member of all three hierarchies, but the send button was only a member of the second two. In this case the application is not accessible because the first hierarchy is not aware of the button and therefore other applications, without using the present invention, have no way of being aware of that object.

Ideally an application communicates its Hierarchy (Hierarchy 2) with the operating system's Hierarchy (Hierarchy 1) through the use of an accessibility framework such as the Microsoft UI Automation and Active Accessibility in the Window's operating system. Microsoft's Automation API is the Microsoft toolset for accessibility. Microsoft's UI Automation and Active Accessibility ensure that applications are accessible to people who use assistive technology products. When used properly, an application's inter-actable objects in Hierarchy 2 are presented to accessibility applications as exposed controls.

Unfortunately, accessibility frameworks such as the Microsoft UI Automation and Active Accessibility used by the Windows Operating System, are frequently ignored and applications fall into a range of inaccessibility which range from totally inaccessible to nearly accessible where nearly accessible means there are only minor differences between Hierarchies 1 and 3.

In order to present an object on the Desktop an application only needs to register a window and specify the window's size and other parameters with the operating system. How the window itself is composed by the application is up to the application. It is entirely possible, even common, that the application composes the window as it would a canvas: it just draws its interface (buttons, menus, labels etc.) into the window. In this case the user sees a typical window hierarchy (Hierarchy 3), but the operating system or the Desktop Manager is only aware of the window itself. Thus, Hierarchy 1 only consists of one item: the window, since the Window object is the only exposed control and all the application controls are either not exposed or inaccurately exposed.

While this represents a seemingly extreme scenario in which the operating system has no hierarchical representation of a window in an application, many applications fall into this completely inaccessible category. But, the opposite is rarely true, almost no applications fall into the completely accessible category with all three of the object hierarchies perfectly in sync.

When a computer operator uses a mouse to interact with an application that does not use an accessibility frame such Microsoft UI Automation and Active Accessibility guidelines or the equivalent on a different operating system/device, any discrepancies between Hierarchies 1, 2 and 3 aren't an issue to the user because the application itself can maintain a typical interaction by only receiving mouse events within the window and then internally deciding how to handle the object that was drawn on the canvas at the time of the event and perform a function consistent with the specified event.

But, when a computer user with disabilities tries to interact with an application that does not use an accessibility framework, the discrepancy between hierarchy 1 and 3 makes the software inaccessible to speech recognition applications and other assistive technology programs.

The lack of accessibility is a serious problem for people with disabilities. For example, users with hand or wrist injuries are unable to position a mouse and click a mouse button due to severe pain. In addition, mice and touch screens are not usable by disabled persons such as quadriplegics. Further, there is evidence that extensive use of mouse-intensive applications over an extended period of time could lead to physical injury to some users meaning they one day may fall into the category of those for whom mouse use is painful.

The software is unusable by a user with disabilities because the operating system is unable to inform accessibility software anything about what controls can be interacted with. Thus, buttons in an inaccessible application cannot be read by a screen reader, clicked by a speech recognition program, or its text properly magnified by a screen magnification tool.

There are tens of thousands of inaccessible or partially inaccessible applications including graphics and legacy applications used on the job by hundreds of thousands of government and corporate employees. Referring to the drawings, FIG. 1, depicts a partially inaccessible application. The application depicted exposes its system menu controls 101. 102, 103 to the operating system, Hierarchy 1. But, the application does not adhere to any accessibility guidelines to that the menus 104 and the controls 105, 106 in the program remain inaccessible to a user of assistive technologies. Computer users with disabilities are frequently confronted with inaccessible or partially inaccessible applications, templates, forms and databases as in FIG. 1. Inaccessible applications place persons with disabilities at a huge disadvantage in the workplace, presenting a needless barrier to their gainful employment, perhaps one reason why the unemployment rate among those with disabilities is twice that of those without disabilities.

These problems are not confined to the workplace. Even most instructional software is inaccessible. In a survey of twenty-five award winning companies who produce pre-college instructional software, not a single company was addressing accessibility in their product development "Designing-Software-Accessible-Individuals-Disabilites", http://www.washington.edu/doit/Brochures/Technology/design_software.html, 2014. Thus, those with disabilities face even face barriers trying access and control software that can help them achieve a quality education.

The problem is getting worse. The barriers to entry in creating applications are being eradicated. It is now easy for non-technical people to create applications. But, only experienced programmers can make the application accessible. A typical example of this is the Microsoft Developer library, "Windows Automation API (Windows)", https://msdn.microsoft.com/en-us/library/windows/desktop/ff486375 (v=vs.85).aspx, 2015, states, "The Windows Automation API is designed for experienced C/C++ developers."

The severity of the problem is evidenced by laws such as Section 508 in the ADA act, which has led to a set of guidelines such as "Software Applications and Operating Systems (1194.21)", http://www.access-board.gov/guidelines-and-standards/communications-and-it/about-the-section-508-standards/guide-to-the-section-508-standards/software-applications-and-operating-systems-1194-21, Jun. 21, 2001. But, laws and guidelines haven't solved the problem, or even lessened the issue.

Since almost anyone can create an application and only experienced programmers can make the applications accessible, there has been an onslaught of inaccessible programs. The need for the present invention becomes clear. The barriers to making applications accessible need to be eradicated. Non-technical people need to be empowered to make applications accessible by letting them quickly bridge the gaps between hierarchies 1 and 3. The present invention provides a novel and comprehensive system and method to do this.

For relief, many users try to address their need for a mouse-free and touch-free graphical user interface by turning to assistive technologies such as speech recognition engines that ship with operating systems such as IOS, Android, Chrome, OSX, Windows, and third-party speech engines such as Dragon Naturally Speaking.

But, prior art technologies do not offer a simple, easy to use or efficient solution. For example, the best of these technologies, Dragon NaturallySpeaking, includes a widely used mouse grid. There are other mouse grid solutions like VoiceComputer's voice mouse. These mouse grid technologies let a user access a particular screen location on a computer device but these technologies were not designed for and are not used in order to drill down or navigate an application because these technologies are: 1) Too slow. Even a proficient user usually needs to issue four or more speech commands to click on a single control and, 2) Too awkward and confusing. Each of the 4+ speech commands needed to click on a specified point requires a mental calculation, "Dragon Naturally Speaking—Test 1", http://athenpro.org/googledocsreports/dragon1.php, 2015, "Dragon Naturally Speaking—Test 2", http://athenpro.org/googledocsreports/dragon2.php, 2015, "WebAIM Assistive Technology Experiment_Dragon NaturallySpeaking", http://webaim.org/blog/at-experiment-dragon/, 2011.

Prior art inventions, for example U.S. Pat. No. 7,742,923 and U.S. Pat. No. 6,615,176, may improve a user's access to controls exposed by the active application in comparison to a mouse grid. That is, they improve access to Hierarchy I controls, controls that conform to an accessibility framework. But, the prior art inventions are not a solution and haven't been successful since they don't address the inaccessibility of the many programs that do not conform to an accessibility framework.

The failure of the prior art technology is demonstrated by the existence of an entire consulting business whereby experts create scripts (small programs usually written in a scripting language that are part of speech recognition program such as Dragon NaturallySpeaking and in screen reader programs such as JAWS) so that users can access various screen locations and overcome the limitations of the prior art. But, even this doesn't solve the problem. Creating these commands is time consuming and expensive, an expense that frequently runs into the thousands of dollars, and, significant difficulties remain even if one invests the time it takes to create a full set of commands for an application or web page. For one, applications are frequently updated, making much or all of previous customization obsolete. For two, many applications require hundreds, even thousands of uniquely named commands. Users cannot be expected to remember the names of hundreds of uniquely named commands, even after repeated use, thus, complicating and slowing down control.

In many cases, software applications cannot be made accessible with prior art technologies. Some examples, JMP, CWS/CMS, CALWIN and many applications that run on the Citrix desktop. These applications are so complex that it would take thousands of individual macros to control them. Such commands sets have never been made because they would be too complex to use.

In some applications like COMPASS, the menus and other controls are Hierarchy 3 controls drawn on the screen, so their controls are unexposed to Hierarchy 1 and the position of the controls change as the application is used making them inaccessible to prior art technology which uses mouse location data to determine where a control is located.

Most applications and websites are not designed for use by speech recognition, screen readers and other accessibility tools and do not fully confirm to any accessibility guidelines. Many applications, websites and web apps do not confirm to any accessibility guideline. Thus, users of accessibility software who have disabilities cannot fully access and control most of their applications.

What is needed is a system and method that delivers what users require to get their work done. Users require a computer application that would allow a computer user, including the 50-60 million people with disabilities in the United States, "Understanding Software Accessibility", http://www.uspto.gov/about/offices/cio/section508/sw_accessibility.ppt, 2004 to easily and productively access, control and navigate all of their computer applications, not just applications that adhere to accessibility guidelines, with accessible technology such as Dragon NaturallySpeaking and JAWS.

GENERAL DISCLOSURE OF THE INVENTION

The present invention meets all user requirements to let users get their work done efficiently without a mouse. The present system is a simple, productive and easy-to-use mouse-free system and method to control all computer devices and applications, including those designed for a mouse. The present invention solves the problems of inaccessibility for users of accessibility software, including speech recognition and screen readers. The present invention is a computer-implemented mouse-free system and method that lets users access, navigate, and control a computer desktop and applications, windows, menus, icons, text entry fields, buttons, check-boxes, drop-down lists and HTML links and all other objects on the computer desktop, including those that are normally inaccessible to accessibility programs on a graphical user interface in a windowed computing environment.

The present invention meets user requirements by letting a computer user access and control anything and everything that a mouse can access and control by providing simple, mouse-free systems and methods that create, display, manage and access markers on a computer display and are used by the invention to simulate computer input, such as mouse, mouse and keyboard, or other low level input, at the marked locations. All embodiments of the present invention form a unified application to deliver global, mouse-free access and control of a computer device's desktop and all applications, windows, menus, icons, text entry fields, buttons, check-boxes, drop-down lists and HTML links and all other objects on the computer desktop, One embodiment of the present invention provides a novel technology that lets users mark and label any and all points and areas on a computer screen and all applications on the computer screen, self-defining the points and areas with a simplicity that requires no technical skill. Thus, the present invention allows an end-user to make any previously inaccessible computer desktop and applications and all other objects accessible with assistive technology software.

One embodiment of the present invention achieves mouse-free accessibility and a mouse-free computer interface by systems and methods that let users send emulated mouse inputs, keyboard inputs, touch screen inputs, simultaneous mouse and keyboard input, and simultaneous touch and keyboard input to any desired screen location on a computer device by managing a multitude of marker collections, which can be bound to specific objects on a computer desktop such as the desktop itself, specific windows in an application or specific controls within an application's window. These collections of markers may be automatically or manually displayed over their particular elements when those elements are visible. If multiple collections of markers are defined for specified regions they may be further differentiated by number, priority, or name. In managing the collections of markers, the present invention furnishes methods that allow for the collections of markers to be dynamically created, deleted, edited, expanded, contracted, renamed, renumbered, reprioritized by simple voice, keyboard, gesture, touch or eye movement commands. The inventive system provides for the combination of mouse, mouse and keyboard, keyboard, or other low level computer input to be simulated at user specified regions via simple voice keyboard, gesture, touch or eye movement commands.

The present invention provides for the creation of markers for objects in a GUI. A marker contains a target screen location and a reference point which can default to the entire screen or can be relative to another object or another marker and in one embodiment can contain a label and or additional metadata. The marker's target may be relative to an application window, monitor, or any object within a window.

The present invention furnishes interaction with those markers either directly by performing actions at the location indicated by the marker or indirectly through its label or metadata such as being read by a screen reader.

The present invention allows the organization of markers into collections where each collection can also contain associated metadata such as a menu, label, description, priority, etc., that describe structure (headings, regions, tables, grid), properties, help text, or other attributes/metadata commonly found in accessibility frameworks to describe objects in a computer system. Markers can be created from multiple sources to create a full collection of markers but not all markers need to be active at one time.

Markers can be created by the user

Markers can be automatically created by image processing

Markers can be automatically created by dividing a known element (such as window, or list box inside a window) by a specified number of times horizontally or vertically.

Markers can be created by modifying (correcting) the automation tree (modifying information about exposed controls).

Markers and marker locations are stored in a computer readable form.

Markers can be created by reading their definition from a file.

The marker locations are automatically determined by an algorithm. (Such as grid of markers in a window or within an object).

In one embodiment the markers are visual (i.e. numbered circles or tags) whereby the user can say 'click 3' to perform a mouse action at the location indicated by the (numbered, lettered or named) marker.

In another embodiment the markers are used by a screen reader in response to a user placing his/her finger over the screen and are treated just like known elements. That is, when a finger goes over a link that is properly exposed it may read 'link click here', and when a finger goes over a marker, the screen reader reads its metadata or a phrase of the users choosing. It would default just to the marker's name.

In another embodiment markers are created for specified HTML elements by analyzing the HTML Document Object Model (DOM) in a webpage or web app.

The present invention provides users with touch and mouse-free access and control of all the applications, screens, templates, forms, web-pages, intranet sites on a computer device. The mouse-free accessibility created by the present invention makes it possible for a user of speech recognition and other assistive technologies to control all applications, including previously inaccessible applications, objects, windows and screen locations on a computer device with a simple computer interface that provides a simplicity and speed that rivals that of a computer mouse. Thus, the inventive system eliminates a user's dependence on application developers to make the content accessible to users of speech recognition and other assistive technologies.

The present system and method have the following capabilities in various embodiments and aspects:

a. Enabling users to access any desired screen position on a computer device in order to productively access, navigate and control the computer device's screens, desktop, applications, windows and other objects.

b. Enabling users of computer devices identify user-specified screen positions, designate the screen positions with user-specified markers or indicators, and automatically store the markers or indicators designating the user-specified screen positions.

c. Enabling a selection system to be exposed whereby a user can add or remove items and categories of items that are detected in accessible interfaces as GUI controls.

d. Enabling the specific screen positions identified by the user-specified markers or indicators to be context sensitive.

e. Enabling the screen positions identified by the user-specified markers to be application, window, object, collection, or desktop specific.

f. Letting users edit and delete the user-specified markers or indicators and the user-specified screen positions that they have identified with the markers or indicators.

g. Letting users attach metadata to individual markers and sets of markers to allow for customized activation commands and to facilitate compatibility with non-visual accessibility needs.

h. Letting users send simulated mouse input, keyboard input, and simultaneous mouse and keyboard input to the screen positions identified by the user-specified markers or indicators.

i. Providing a rich-text environment so that speech recognition operators can use the full dictation and editing capabilities of their speech recognition software so that they can dictate, correct and edit their text and then insert the text at the screen positions identified by the user-specified markers or indicators.

j. Letting a user employ speech recognition, Eye Gaze Edge® technologies, and switch access scanning technologies, brain-wave based technology and other hands-free technologies, touch-screen technologies, and the keyboard to identify the user-specified markers or indicators. The present invention makes these technologies more productive because the present invention can mark a small control or object on the screen by a large mark and making it easier and faster for a user to interact with using eye tracking or gesture tracking.

k. Enabling users to access the user-specified markers or indicators in order to send simulated mouse input, keyboard input, and simultaneous mouse and keyboard input to multiple screen positions, and/or can drag and drop between said screen positions with a command or a series of commands; for instance, in a paint program, the operator can identify user-specified screen positions on the canvas, designate the screen positions with user-specified markers, and then draw between the user-specified markers using the drag commands such as drag 5 to 15, alt-drag 23 to 12 to 14, shift-drag 45 to 2 and ctrl-drag 35 to 12 to 87 to 3.

l. Letting users automatically access a succession of screen positions identified by the user-specified markers with a sequence of commands.

m. Enabling the screen positions identified by the user-specified markers to be application, window, object, or desktop specific.

n. Enabling the screen positions identified by the context-sensitive, user-specified markers on multiple applications, windows or objects to be simultaneously displayed.

o. Letting let users with minimal computer skills create user-specified markers or indicators to identify user-specified screen positions.
p. Letting users simulate input between multiple markers potentially from different sets of markers, e.g., drag 1 to 10 or click 1 2 3 type "hi" in 4.
q. Automatically number or letter a collection of markers for easy identification with speech recognition.
r. Attached a specific name to a marker or a collection of markers so a user could say "Click Send" to click a marked send button or Overlay Print Menu to display a collection of markers the user specified as the "Print Menu" collection.

The present invention provides systems and methods that enable an end user with no specialized or technical skills to quickly and easily make previously inaccessible applications accessible. By so doing, the present invention enables a user to utilize speech recognition and other assistive technologies to select and control any visually indicated menu, button, hyperlink, text field, etc. on a display screen or in an application. This inventive system enables all users, including those with disabilities, to use speech recognition and other assistive technologies, to easily and productively access and control any application, including applications that do not conform to any accessibility framework.

BRIEF DESCRIPTION OF THE DRAWINGS

FIG. 21 presents a screen of an exemplary embodiment in which a marker collection is created by image processing in accordance with the invention.

Like reference symbols are employed in the drawings and in the description of the preferred embodiment to represent the same, or very similar, item or items.

DESCRIPTION OF EMBODIMENTS

Figure 1:
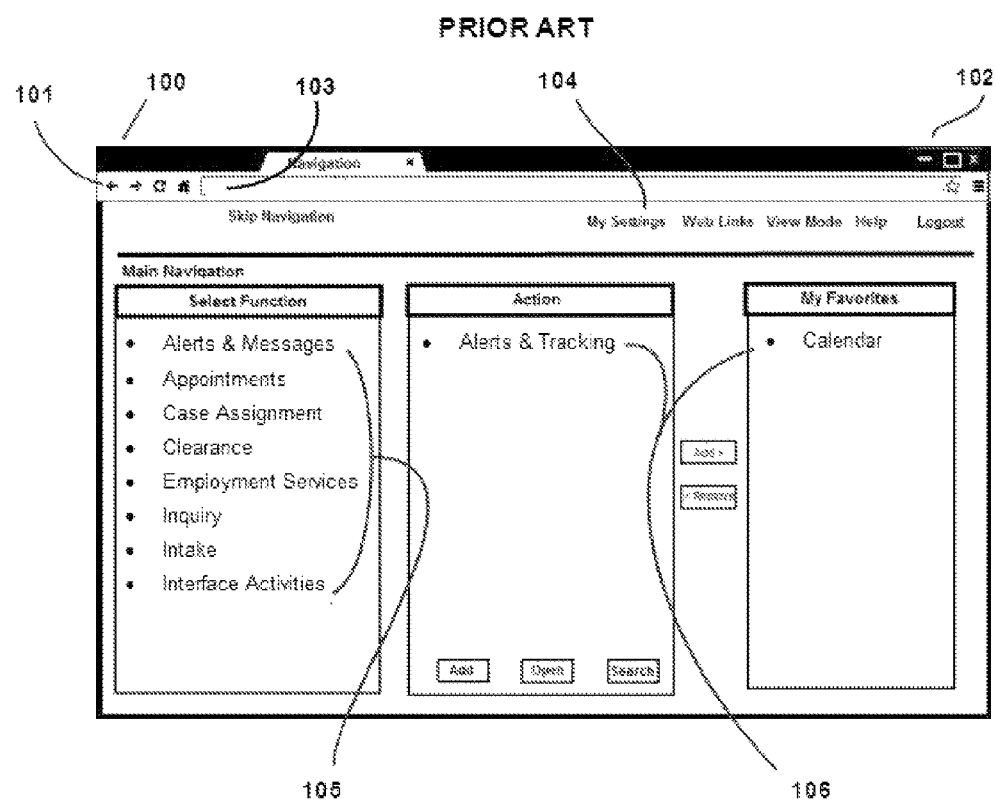
FIG. 1 presents a screen of a prior art example of Hierarchies 1, 2 and 3 which illustrates the objects in a window and the ones that are 'exposed' to accessibility software.

The present invention furnishes a computer-implemented, mouse-free system and method to access, navigate and control a computer desktop, applications and objects, including applications and objects that don't adhere to any accessibility guideline, in a graphical user interface (GUI) in a windowed computing environment. The present system delivers easy-to-use, highly productive and universal mouse-free accessibility and control of a computer desktop and all applications and screen locations, with a system and method to create, display, manage and access markers on a computer display that are used to simulate computer input (mouse, mouse and keyboard, keyboard, or other low level input) at the marked locations. The inventive system can be implemented on any existing graphical interface technology and can be controlled voice and by a variety of mouse-free technologies. It is applicable to all computerized devices including personal computers, workstations, personal digital assistants, smart phones and tablets. The present system can be implemented as a feature of a software application or operating system running on such a device. Accordingly, the inventive system can be implemented as part of a GUI for controlling software on such a device.

In one embodiment, the present system awaits an indication from the speech engine that an application command is recognized. In other embodiments, input can be received from the keyboard, switch scanning devices and other input devices. In this embodiment, the inventive system tracks the commands that are currently active to determine which commands should be acted upon.

Once a command to issue an overlay has been issued, the command is analyzed to determine the type of overlay command which in accordance with one aspect of the present invention can fall into one of three categories: (i) context sensitive, (ii) a mix of context sensitive and specific, and (iii) specific.

In one embodiment, if the present system receives an indication that a "Overlay Window" command has been received but the present invention does not have any collections matching the current context sensitive conditions, in accordance with the present invention a new empty, transparent overlay is created with the context sensitive conditions required and the present system would display an transparent overlay over the current window. In one embodiment, the inventive system would render an overlay over the current window with a slight grey hue layer over the window to indicate that new markers can now be freely created. Similarly, in this embodiment, if the invention received an indication from the operating system another invention command has been received, such as "Overlay Desktop", "Overlay System Tray", "Overlay Start Menu", "Overlay Monitor One", "Overlay Monitor Two" and "Overlay Monitor Three", the present invention would display an transparent overlay over the computer device's desktop, system tray, Start Menu, monitor one, monitor two, and monitor three respectively.

In the embodiment being discussed, a transparent overlay is created over the target window, desktop, system tray, start menu, screen, or other object to create visual representations of the markers. The transparency of the overlay, color, shape and any text of the marker can be modified by the user. A request to create a new window at the site of the current target creates the overlay. The type of the overlay determines how the size of the target is discovered. A window, screen, Start Menu or other object known by the operating system dimensions' can be determined by querying the operating system's API. A custom object's size is determined by its corresponding finder (if created by being marked by the user the user specified the size, if found by image processing, the image processor determined its size.)

Once the window's initial size is determined, the size and dimensions of all markers are created. In one embodiment, markers are displayed slightly off the top right corner of the marked object to make sure the markers don't hinder the user's ability to read from left to right. This means a marker's bounds may extend past the edges of the object being overlaid, so after all the marker's bounds are calculated the transparent window must be resized to make sure all of its markers are visible. If the window was resized the position of the window may also need to be adjusted to insure the markers still align correctly relative to their corresponding marked objects.

Finally, the current embodiment requests that the operating system display the transparent window at the specified location, which produces the effect of creating a windows overlaying the target. (All widely used operating systems support transparent windows, but other techniques are needed in operating systems that do not support transparent windows. Such modifications can be made by those skilled in the art without departing from the true scope of the invention.

In one embodiment, if the present invention receives a "Click 5" command and the present invention is not displaying one of its overlays, the system takes no action. If the present invention is displaying one of its overlays to the present invention simulates a left click on the point indicated by marker whose label is "5".

In one embodiment the command "Show Overlay" is a context sensitive command which will first determine the state of the GUI (which window is focused, the window's title, and the owning process's name) and use that information to query the invention for a collection of markers which best matches the provided information. If found, the markers that make up the matched collection will overlay, i.e., create a transparent label over a section of the user's output display device(s), the area of the screen that matched those conditions, in this example, the specific window. Once an overlay is displayed, commands that take actions on the overlay's markers, e.g., simulate input, create, and delete, become active while overlay commands such as "Create Overlay" remain active.

In one embodiment, an example of a command that is both context sensitive and specific is "Show overlay 5". This commands handles the case where multiple overlays match the current context sensitive definitions and indicates that that fifth such collection should be displayed on the screen. Another example would be "Show overlay format commands" which search the overlays matching the current context sensitive conditions (i.e. the active window) and choose from those the marker collections named "format commands".

In one embodiment, if the present invention receives a "Desktop Click 5" command the present invention will open an overlay for the desktop and simulate a left click on the point indicated by marker whose label is "5".

In one embodiment, if the present invention receives a "Window 3 Click 47" command the present invention with open the third overlay for the specified window and simulate a left click on the point indicated by marker whose label is "47".

In one aspect of the present invention, users can name their own commands. For example, a user can name the "Window 3 Click 47" command in the preceding example, "Show Reviewing Pane".

In one embodiment, an example of a command that is purely specific would be "Show overlay desktop". This command would query the present system for an overlay with the name "desktop" and ask that collection to be displayed over the area of the screen for which the collection was defined regardless of the current context sensitive conditions in the GUI.

In one embodiment, the size of the overlay is determined by the corresponding dimensional data stored with a collection of markers. The color, level of transparency, of the overlay, as well as the colors, opacity, and shapes/images of the markers themselves are adjustable and are defined by the user through a user configuration file such as an XML file with separate entries for the color, level of transparency of the overlay and color, opacity, and shapes, image selector of the markers.

In one embodiment, in order for the present system to know a point should be created at a specific location within an overlay, the system compares mouse click locations to the dimensions of the current overlay, which is determined by the values stored in the displayed collection of markers. Similarly, to simulate mouse input on a specific marker, one embodiment of the current invention retrieves the stored information about specific markers to process those commands. In this case the present invention may need to determine the point represented by the marker, the dimensions of the overlay (via the collection), so it can combine that information with information about the resolution of the screen and its current resolution, dots per inch ("DPI"), to determine coordinates where mouse simulation should occur.

In one embodiment, the present system stores markers in collections along with relevant metadata needed to provide a range of querying services so that different collections can be displayed in a productive context-sensitive manner.

In one embodiment, the marker collection can create a new collection. Upon doing so the collection does not contain any markers but may contain initial metadata based on the state of the computer when the collections was set to be created. This applies to creating overlays through the application itself. Collections can also be manually created by directly manipulated data files as well, but that is not as efficient or simple as the how they are managed through the application itself.

In one aspect of the present invention, when the overlay is displayed, markers can be added to the rendered collection. In one embodiment, points (markers) are added when the input manager detects a mouse click at a screen location which falls inside the area of the displayed overlay. The present system creates a new marker at the specified point and stores points in a collection both relative to the overlay's dimensions and to the absolute pixel location on the computer screen. That is, the points that define markers are stored relative to the overlay's dimensions, which correspond to the dimensions of the window it is overlaying, so that the points are drawn over the same corresponding GUI locations on subsequent uses. This is a key element of the present invention since inaccessible applications do not expose any controls to accessibility so there is often no way to identify a button at the specified location within the application except by using a relative screen location.

Markers may also be relative to controls within windows, but based on user configuration. In one embodiment this feature is disabled to keep it as simple as possible for the user.

One embodiment of the present invention automatically creates markers using image processing. Markers can be discovered by image processing by taking a screenshot of the object being marked (a window, object, or entire screen.) and then analyzing the image to find buttons, menus, fields, etc. Once found, the embodiment uses the image processing data to classify each found object as a button, menu, and also records their dimensions so they can be treated in the same way as objects known by the operating system.

PDF readers, Word templates and other programs can be configured to 'Highlight Existing Fields'. The present invention can be configured by the user to identify fields with a specified background color and mark them as in FIG. 21. This aspect of the present invention lets a user quickly edit and fill out the fields 400, 401, 402 in PDF, Word and other templates.

Figure 21:
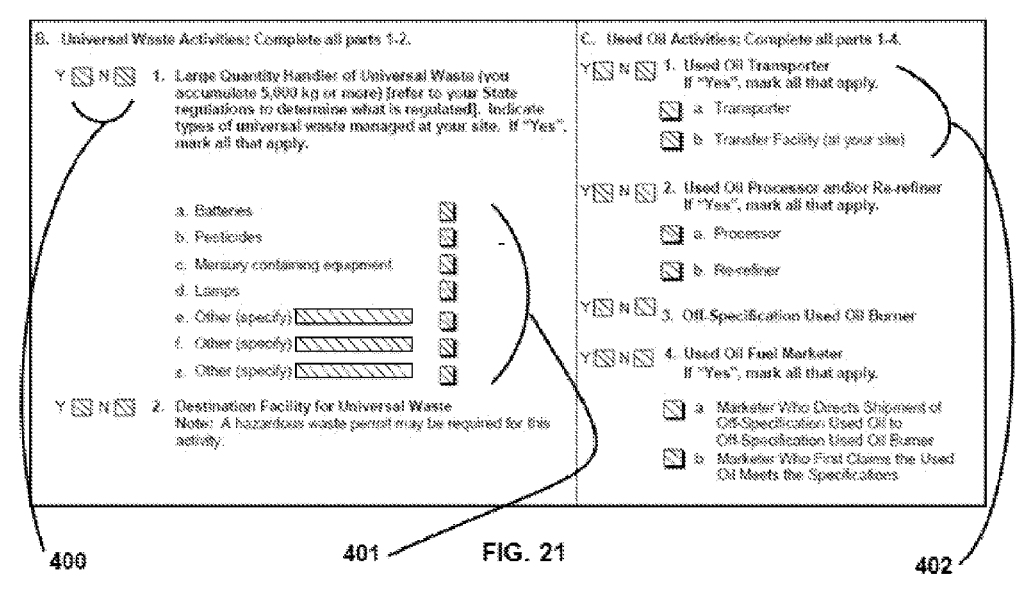

In one embodiment, image processing is used to find fields in a PDF file or a Microsoft Word template. FIG. 21 shows how one embodiment of the present system operates. When an invention command is received, this embodiment determines the target for the overlay. In this case it is a foreground window object displaying a PDF. Next, the embodiment checks a database of known PDF applications to determine in which object inside the window a PDF is being displayed and properties relating to how they are being displayed. The properties about how they are being displayed contain information such as the highlighted color of fields, which are used during the image-processing step. These properties differ for different applications.

Another embodiment, when an application's image processing properties are not found in the database of known applications allows the user to indicate the needed properties verbally. For example, "overlay orange fields". In all regards other than how the image processing properties are retrieved, that embodiment works like the embodiment being discussed.

The embodiment then uses those properties while performing image processing to find fields and mark fields in a PDF document. In the case of PDF files the specific process involves converting the screenshot from BGR color space to HSV color space and doing the same with the property describing the PDF form's highlight color. Next a threshold filter is applied to rule out areas very unlikely to be fields. The result of the threshold filter is a black and white image which can then be used by a contour detection algorithm to generate a list of clustered areas which could possibly represent fields. Next an approximate polygon is created for each set of contours. Each polygon whose properties such as bounding area, number of lines fit a threshold for closely resembling a field (typically a rectangle of a certain size—determined by the image processing properties) are selected and converted into an approximate rectangle. The rectangles are then converted into markers by taking projecting their vertices from the image space into screen space so that when they are used by marker's mouse and other input can be simulated at the correct locations.

The present system provides user interaction assistance to all applications running on a GUI. An advantage of the present system is that it makes inaccessible applications accessible. Inaccessible applications are those that do not conform to accessibility guidelines such as Microsoft's UI Automation and Active Accessibility to expose the applications controls such as menu items, buttons, checkboxes, etc. to speech recognition and other accessibility software. For example, the developers of a particular application may expose a clickable button control to open a file within their application. The user would typically interact with that control by clicking on it, and so the mouse is the standard input method in this case. As is also common, the application developers may not have developed a shortcut key for that button either, meaning not only is the mouse the standard input method, and it is the only input method. Had the developer exposed the button control, the developer would have potentially allowed a screen reader, speech recognition program or other assistive technology the ability to detect and interact with that button without the mouse (non-standard input). This interaction is typically defined according to the invoke rules for controls within an accessibility interface.

The present system allows users to similarly expose all objects within a third party application even though: 1) the third party application developers did not develop the application in accordance to accessibility guidelines, or 2) the user of the third party application has no any knowledge of accessibility interfaces. Thus, the present system provides a simple, universal and productive way for all users, including those with disabilities, to interact with all applications and objects displayed on their output display and use their preferred method of input, be it speech recognition, a switch-scanning device or a screen reader.

Consider how the present system allows a speech recognition user to interact with an application that is only controllable with a mouse because the application does not conform to any accessibility guidelines. For example, if the application has a load file button, the only way a user can access the button is to left click that element. As is discussed elsewhere in this application, such a lack of accessibility makes routine operations awkward to carry out with speech recognition software using prior art technology. Prior art technology would require that the operator, 1) Use a technology like Dragon NaturallySpeaking's mouse grid technology in order to issue a sequence of commands to click on the load file button, or 2) Require that the user or an expert creates voice macros to click on the load file button with speech recognition commands.

In one embodiment, the present system stores collections of markers that can be displayed transparently over a section of the user's output display device(s). Each collection of markers stores information to identify which windows in a GUI the collected markers are associated with. By tracking the state of the GUI, this embodiment is able to determine when a specific application is rendered on the user's output display device and either automatically, or per a user request, display that marker collection on top of its target application's window on the output display(s).

For the purposes of describing the present embodiment, the visible rendering of a collection of markers over a region of the output display device is referred to as an overlay. Overlays are essentially application windows within the GUI that typically have a level of opacity to allow the user to view the underlying application and instruct the GUI to place the overlays on top of any other elements being rendered on the output display device. In this embodiment, the size of an overlay is determined by the corresponding dimensional data stored with a collection of markers. The color, level of transparency, of the overlay, as well as the colors, opacity, and shapes/images of the markers themselves are adjustable and are defined by the user through a user configuration file such as an XML file with separate entries for the color, level of transparency of the overlay and color, opacity, and shapes, image selector of the markers.

Each marker in a collection has an associated label that is also rendered in addition to the marker's visual indication. In one embodiment, the displayed label is simply the marker's number within a collection, where 1 corresponds to the first marker in the collection and N corresponds to the last marker in the collection where N is the number of markers in the collection. This embodiment is initiated by a user initiated voice command from a speech engine. Upon receiving the request "Show Overlay" the embodiment determines the state of the GUI and checks that against the embodiment's marker collections for a matching collection. When found, the application determines the target window's dimensions on the output display and renders each marker within the collection over its specified location. This transparent layer that is displayed above the specified window on the computing devices output display constitutes the Overlay.

In other embodiments, input can be received from the keyboard, switch scanning devices and other input devices. In one such embodiment, the present system tracks the commands that are currently active to determine which commands should be acted upon. This embodiment's speech commands are context sensitive in that the embodiment tracks which command should be active or inactive in an effort to improve the speech engines accuracy. One advantage of this design is ease of use and increased productivity for the user. Context sensitive not only allows certain commands to only be recognized in certain instances, as we will see with the "click 5" which we will discuss in detail later, but which is only recognized when an Overlay is being displayed, but it also allows specific commands, such as the "Show Overlay" to have different meanings in different contexts. Above "Show Overlay" triggered the display of a particular Overlay, and later we will see how the command can also be used to create a new collection of elements for a particular object in the GUI.

In this embodiment the markers store their position relative to the window and the collection of markers stores the dimensions of its target window when the window was created. This information is used to insure that the Overlay displays markers on the output display over the areas of the application the user intended to "mark". For example, assume the user created a marker to indicate a window's "Open File" button. To work with unexposed controls, this embodiment assumes that no information about that button can be retrieved from the target application other than its visual position on the screen relative to the top left position of the window itself. To insure the marker remains over that "Open File" button when the Overlay is displayed, the application restores the window to the dimensions it was when the marker's overlay was created, so that the marker will be displayed on the output display device at exactly the same place in which was created over the exact location within the window being overlaid.

While the previous discussion describes the default behavior of this embodiment, not all collections of markers need to display markers relatively to insure the markers are drawn at the correct locations. For example, one embodiment could also overlay the entire output display instead of one specific window. In this embodiment, marker collections are most easily created/modified/deleted by interacting with a displayed overlay. Collections of markers and their markers can also be created, modified, deleted by directly interacting with their data files, or by using associated built in voice commands.

In this embodiment, a user can create a marker by left clicking at a location within an Overlay or by using speech recognition commands or other hands-free technologies to indicate where a marker is desired. Once indicated, this embodiment determines in which visible overlay the mouse action occurred and also determines which overlay collection was associated with that overlay and creates a new marker at the clicked location. When created, a marker is given a default label to uniquely identify it. In this embodiment, the first label in a collection would be numbered 1, and successively created markers would be labeled N+1 where N is the number of markers in the collection.

A user can also delete a marker by right clicking within a visibly rendered marker or by using speech recognition commands or other hands-free technologies to indicate which marker to delete. In this embodiment the present system then locates the specific overlay, its bound collection, and the specific marker within its collection in order to remove the marker. Deleting specific markers causes other marker's default labels to renumber. Specifically if the marker "2" were removed, each marker whose default label were greater than 2 would be renumbered, its current label value minus one.

Issuing the "Show Overlay" command or the command "New Overlay" can create new collections of markers. The "Show Overlay" command creates a new overlay if the active window in the GUI does not have any collections associated with it. When first created, a new collection of markers is rendered as an empty Overlay (that is, it has no markers). In this embodiment, the Overlay is visually represented by visually rendering a slight hue with an outline of the Overlay's dimensions. The color is user adjustable but defaults to grey.

In this embodiment, if one or more collections of overlays exist for a specific window, additional collections can be created with the command "New Overlay" and the new collection is then rendered as an empty Overlay. In addition to the transparent background, when the Overlay being displayed matches multiple collections of markers, that information is also rendered within the overlay. By default, Overlays are numbered so that if a user creates a second overlay for a specific window, the bottom right of the new overlay would display the text 2/2 to indicate this is the second matching overlay collection for that window.

Multiple collections for a single application allow the user to organize overlays according to function. In other embodiments, such organization could allow the present invention to be used as a teaching tool by indicating important functions within an application, or by being used to indicate locations on a screen for a step-by-step tutorial.

While an Overlay is displayed, one embodiment accepts commands such as "Click 5" or "Drag 21 to 54". These specific commands are determined by a default set of commands or user created scripts. A key functionality is the ability to retrieve the marker and information about a specific marker in a collection of markers. Consider "Click 5", which semantically means "Simulate a mouse left click at the location indicated by the marker whose default label is 5". This embodiment finds the currently displayed marker whose default label is 5 and retrieves its specified location coordinates on the computer device's output display. This location can then be used by a number of input devices or operating system specific instructions to simulate input at that screen location.

In this embodiment, the present system calculates the screen location by first calculating the markers position within the Overlay and then adjusting those coordinates that are then transformed to a physical screen location (pixel) by adjusting the logical point by the output display device's resolution, DPI, in the vertical and horizontal dimensions. Once the pixel for which to simulate input on has been calculated, there are many industry standard ways of simulating input at that location which vary according to computing device and the computing device's operating system.

Figure 2:
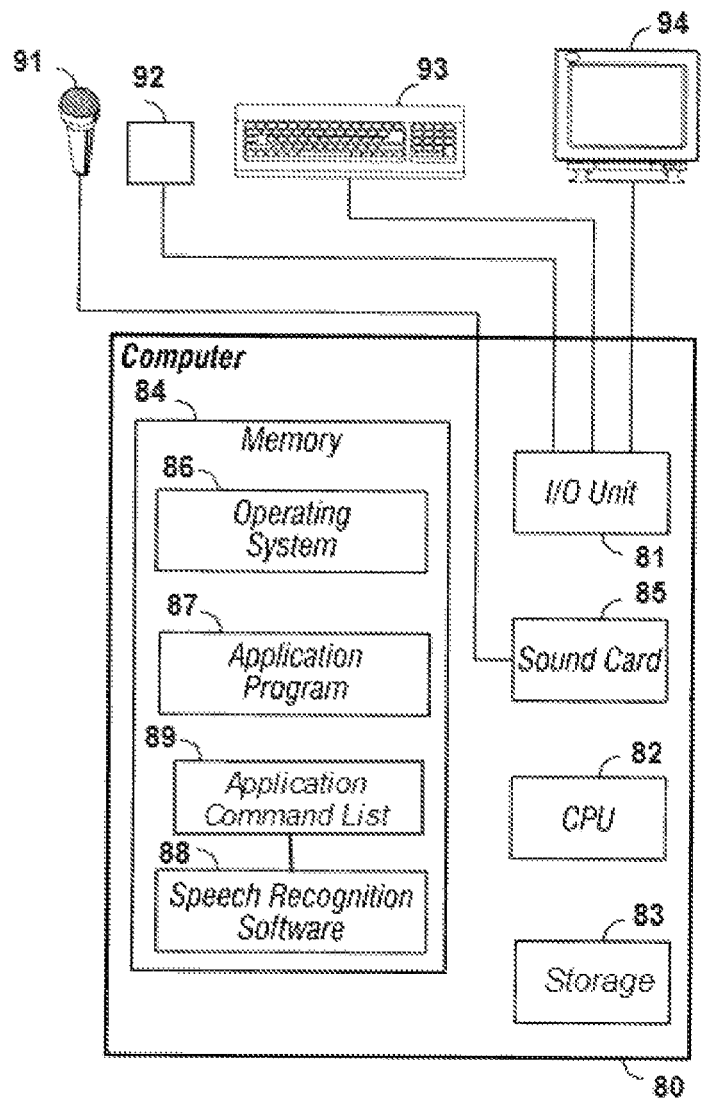
FIG. 2 is a block diagram of a computing environment in which embodiments of a mouse-free system in accordance with the invention can be implemented.

Referring to the drawings, FIG. 2 shows a computing device 80 formed with a number of basic subsystems represented by blocks for ease of illustration and suitable for implementing the present mouse-free system. Computing device 80 includes at least one central processing unit 82, input/output unit 81, storage system 83, memory 84 and may include a sound card 85. System memory 84 typically includes an operating system 86, one or more applications 87, and speech recognition software 88. In addition to system memory, computer device may include a storage device for storage of information 90 such as computer readable instructions, data structures, program modules, or other data. Computing device 80 includes at least one input device such as microphone 91, switch scanning device 92, keyboard 93, etc. Output devices 94 include a display which is logically or physically divided into an array of picture elements referred to as pixels. Other output devices such as speakers and printers may also be included (not shown).

To understand how the present system receives commands from a speech recognition application, it is necessary to know how speech recognition applications distinguish commands from non-command words. Commands are stored in command lists 89. The speech application reads the command lists when it is opened and places the commands in the command lists into active memory, making these commands "active", allowing the speech recognition engine to recognize these commands when spoken by a computer user. Some speech applications use dynamic command lists, allowing command lists to be added or removed from active memory. Most speech applications dynamically load command lists for the active application, automatically deactivating commands for inactive applications. To instruct a speech recognition application to understand the present invention's commands, the present system adds its commands 89 to that of the speech application's command list, which is then read by the speech recognition application, allowing the speech recognition engine to recognize these commands when spoken by a computer user, and send the command(s) to the inventive system.

Figure 3:
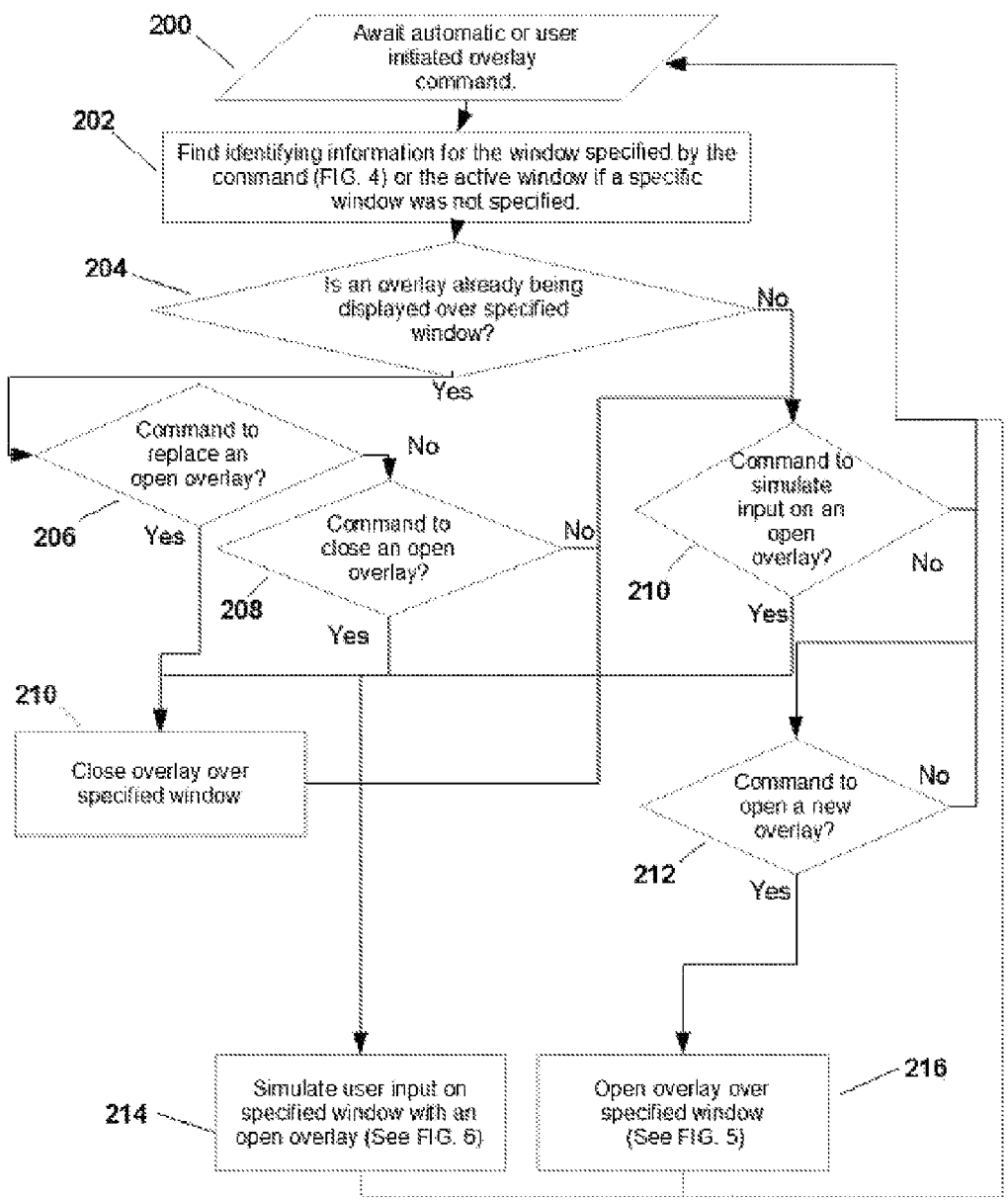
FIGS. 3-7 are flow charts illustrating steps associated with receiving commands in accordance with the invention.

FIG. 3 shows how one embodiment of the present system operates. When an invention command is received, the present system identifies the system's current state, such as which windows are possible marker collection (overlay) targets, which window has focus and, if possible, which screen, which within the focused window has focus 202. (This process is further detailed in connection with FIG. 4.) The inventive system then analyzes the received command, to determine whether the command needs to open a new marker collection, replace a visible marker collection with another marker collection targeted to the specific app (or screen area) being overlaid, or if the command needs to trigger input between different areas marked by visible marker collections 204, 206, 208, 210, 212. The process is so described because one command is not limited to one action. For example, an invention command, "Follow 12 to 3", instructs the present system to click the center of point 12 visible in an open overlay (marker collection), then close that overlay and open overlay 3. The end result of overlay commands are that an overlay is opened 216, an overlay is closed 210, or input is triggered on one of the points marked by an open overlay 214. In another embodiment, specific overlay commands further identify a more specific region inside of a window, such as the html document within a web browser or the spreadsheet area within Excel or Calc. Additionally other embodiments could use the macro sets in non-context sensitive way such as displaying markers over a specific region of the computer display (such as the upper middle section of a computer display 394 in FIG. 20).

A marker collection is a database of markers where each marker contains coordinates, a label (a number by default), and optionally other metadata such as a name or description. Each collection of markers contains a target descriptor, original target coordinates and dimensions, and other possible metadata such as name, number, opacity, background color, and font color to use to display marker labels, marker display information such as a shape or icon, and description. The target descriptor can be an application's process name, the title of a window within that application, a specific region of a screen defined by top, left, width, height coordinates, or a specific control within a window such as the left panel inside a window.

Figure 5:
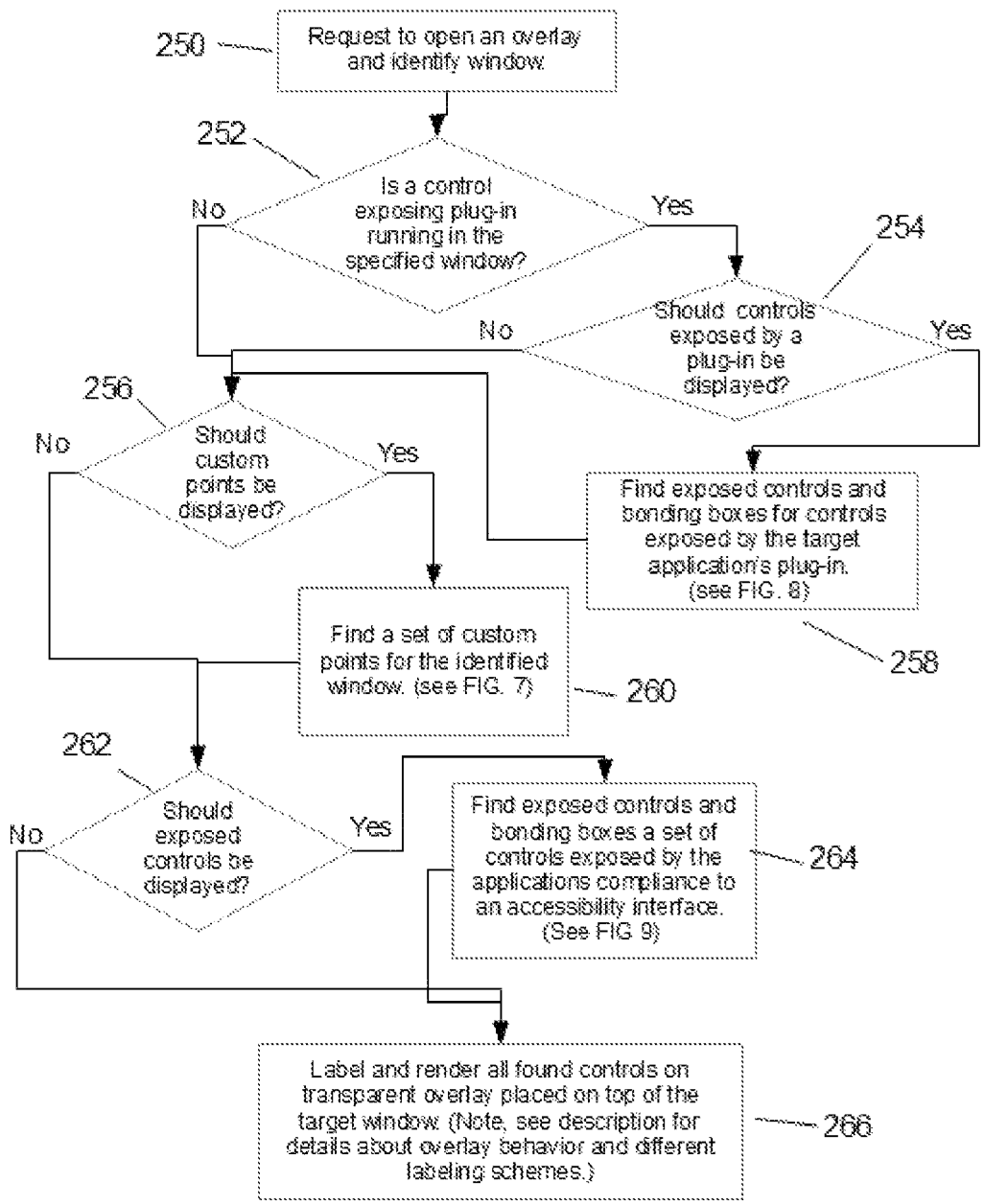

The size of the markers, their numbers, and their appearance in these drawings are configured to be clearly identifiable 216 as indicated in FIG. 5. However, the present invention is not so limited. The overlay's transparency can be customized by the user and can be configured to display a user definable grid, numbered buttons, icons or other markers superimposed on the GUI, highlighted areas, and/or to display desired text and graphics on the GUI. Further, the background color and the size of the numbers or other text displayed on the overlay are configurable by the user. The display of the markers can also be configured as to intermittently enlarge the numbers of the text being displayed, in order to make the text clearly visible on computing devices with a small screen.

The overlay itself 216 is rendered according to the metadata in the collection of markers defining the overlay and is further rendered to be above the target location and not be directly user inter-actable so that the overlay itself can remain open while the user interacts with the target location in standard ways. This is an important aspect of the present inventions since the invention doesn't force users to use only the invention's system and methods. The present invention provides all of its features so that they work in conjunction with all other input methods a computer operator user wishes to use. This aspect of the present invention lets the computer operator pick and choose the best technology the user needs to get his/her work accomplished.

Figure 4:
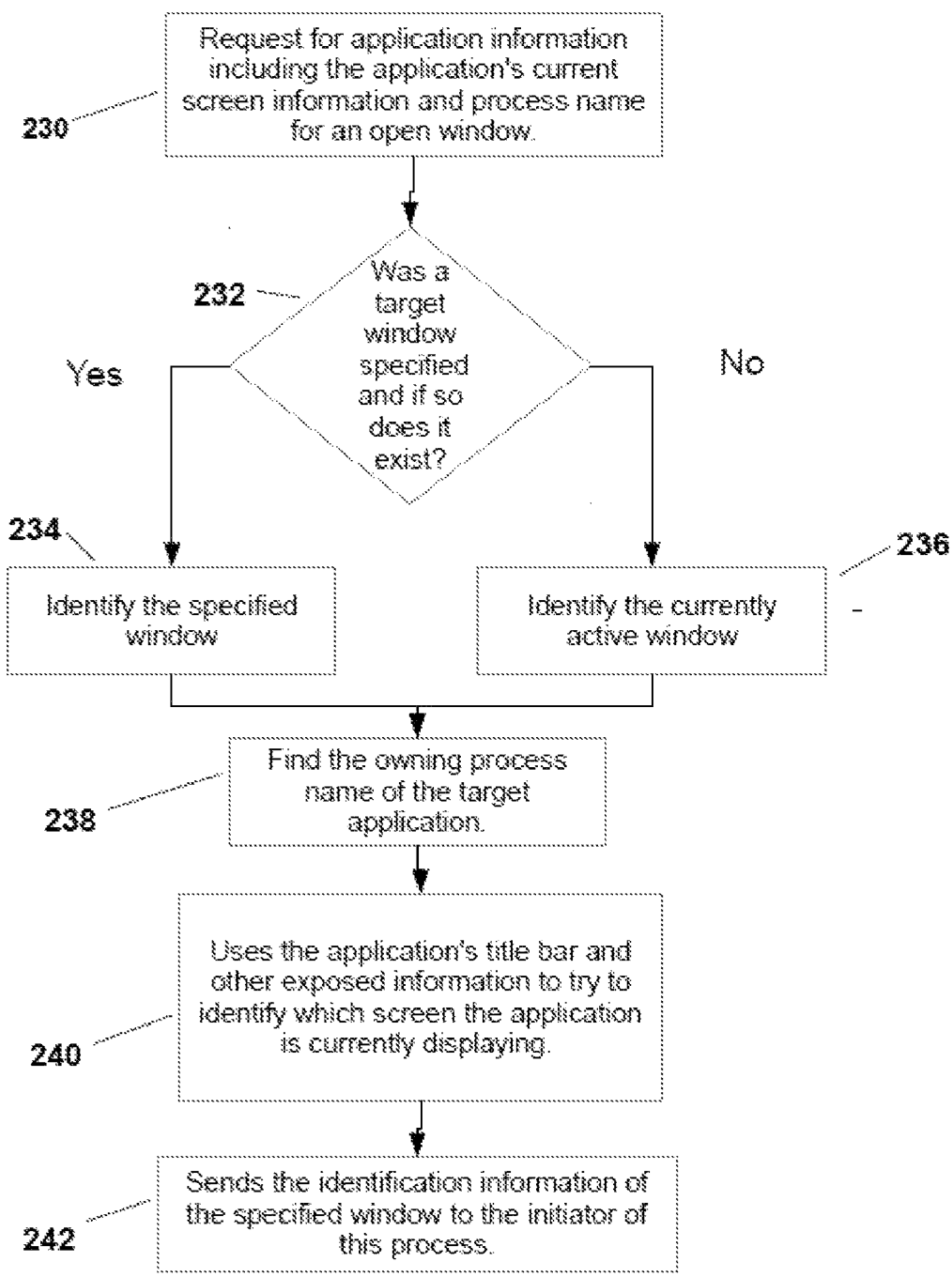

FIG. 4 depicts how an embodiment of the present system operates upon receiving a request for application information, including the application's current screen information and the process name for a specified open window 230. The embodiment determines whether a target window specified, and if so, determines whether the window exists 232. If a window was identified, identify the specified window 234. If a window was not specified, identify the active window 236. The embodiment finds the owning process and the name of the target application 238. The embodiment uses the application's title bar and other exposed information to identify which screen the application is currently displaying 240. The embodiment sends the identifying information of the specified window to the initiator of this process 242.

FIG. 5 depicts how an embodiment of the present system operates upon receiving a request to open an overlay for an identified application or screen area 250. The present system maintains a sets of multiple user defined points for the identified application and screen context 260 (fully detailed in connection with FIG. 7 where each set is defined as a group of points to be displayed on a single overlay.

Figure 6:
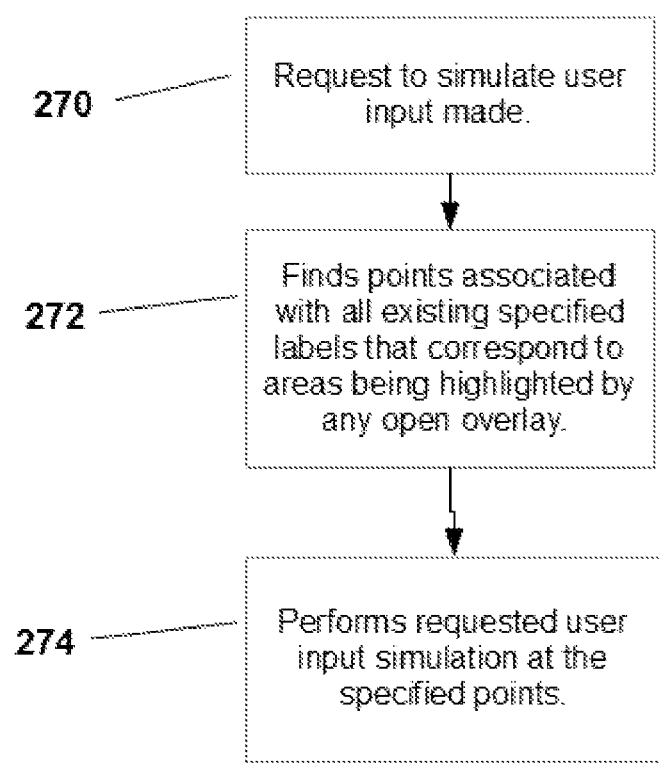

FIG. 6 depicts how an embodiment of the present system operates upon receiving a request to simulate user input 270. The embodiment finds points associated with all existing specified markers that correspond to areas being highlighted by any open overlay (multiple overlays on different windows may be open at one time) 272 and performs requested user input emulation at the specified points, such as the invention commands, "Click 5" or "Click 5, 6, 7", or between specific points 274, such as "Drag 11 to 15". Similarly, a user can send mouse input, keyboard input, touch input, simultaneous mouse and keyboard input, and simultaneous touch and keyboard input to the computing device.

Figure 7:
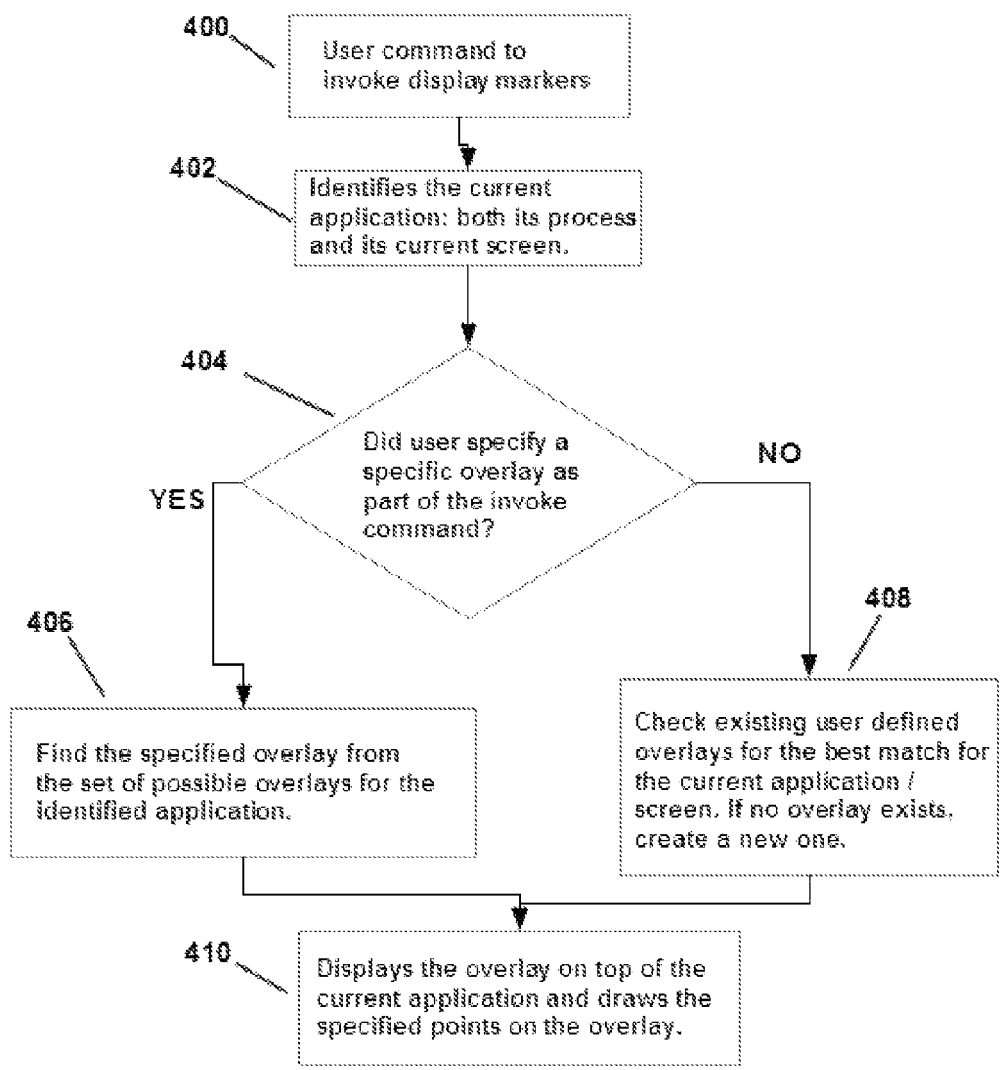

FIG. 7 illustrates how an embodiment of the present invention selects a set of defined markers (custom points) to be displayed on an overlay 260. This method creates an accessible interface for applications that either do not or do not fully implement active accessibility. When this method receives a request for custom points for a specific application and for that application's current screen 280, it determines whether the user specified an overlay as part of the invoke command 282. If the user specified an overlay, e.g., "Show overlay 3", this embodiment finds the specified overlay from the set of possible overlays for the identified application 284. If the user didn't specify an overlay, this embodiment checks existing user defined overlays for the best match for the current application/screen. If no overlay exists, it creates a new set 286 whereby the user will be able to add their own points which will be brought up in subsequent commands. This method then sends the accessible points to the caller 288 to be displayed.

Figure 8:
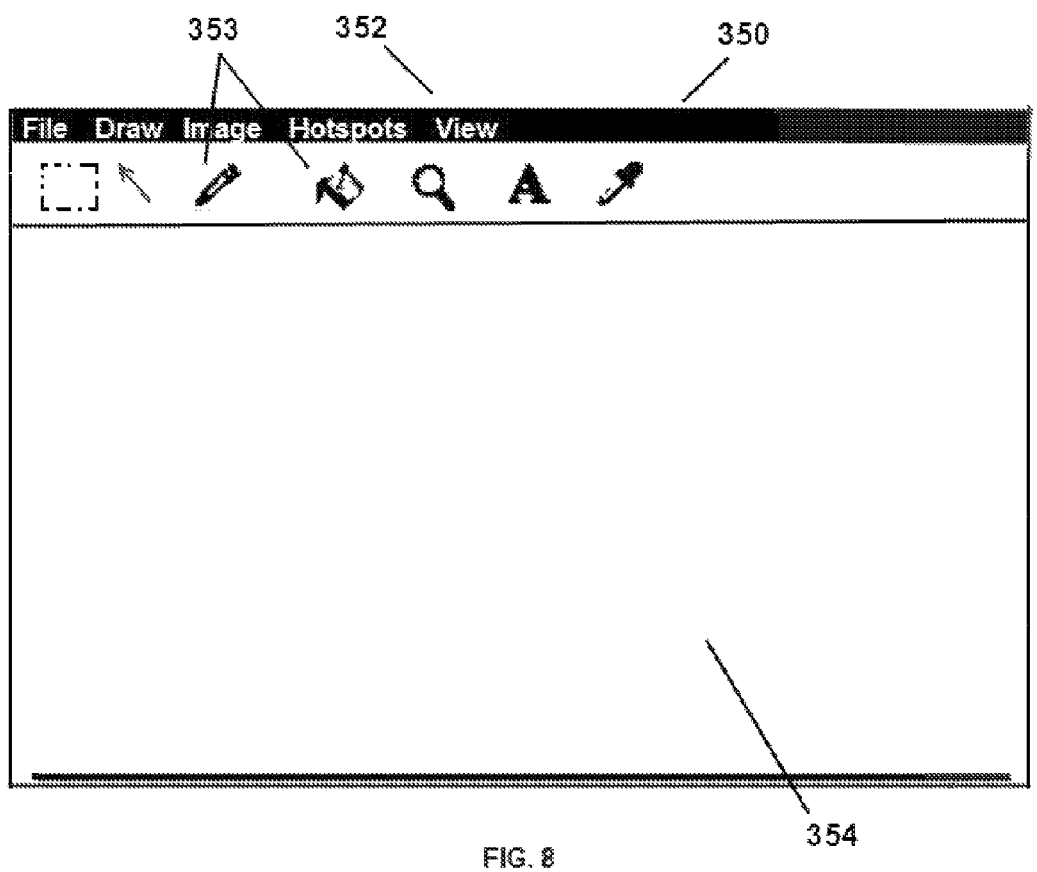
FIGS. 8 and 9 present exemplary screens of prior art graphics applications that do not conform to accessibility guidelines.
Figure 9:
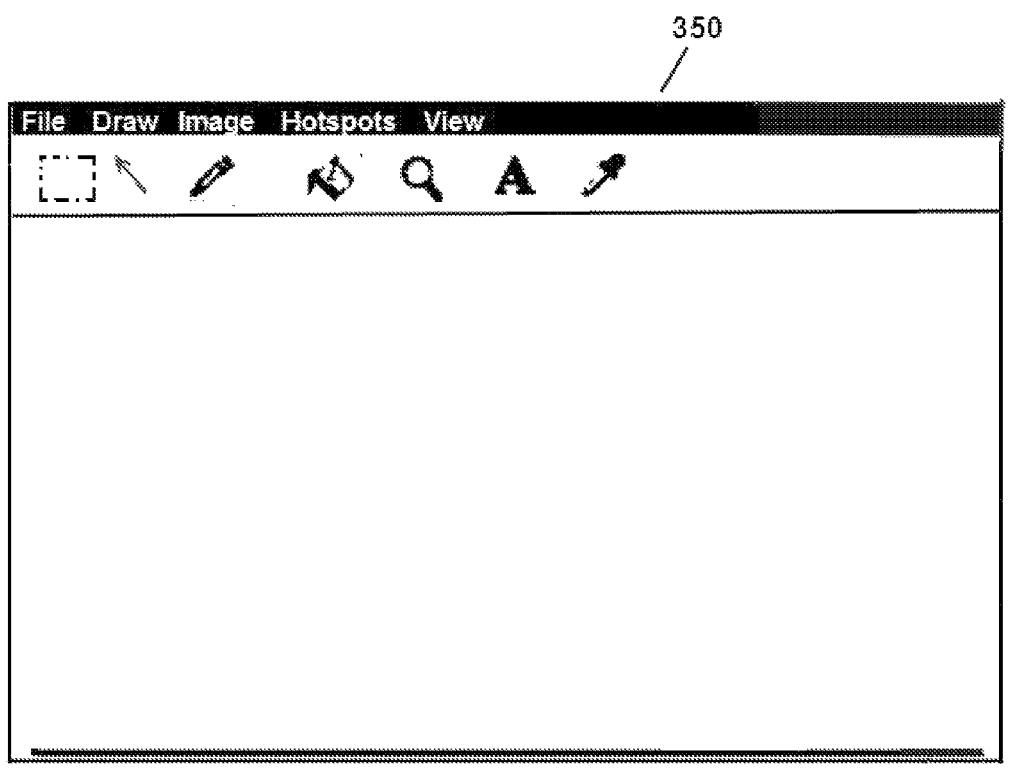

FIG. 8 illustrates a typical graphics application 350 that does not conform to an accessibility guideline. While some prior art assistive technologies let a user access the top level menus such as File, Draw, Image, Hotspots and View 352 and a few prior art assistive technologies let a user access other top level controls such the pen and fill icons 353 if these controls are exposed to accessibility, no prior art technology lets a user quickly access specific locations on the core element of the application, for example, the drawing surface 354. The present invention overcomes these deficiencies.

Figure 10:
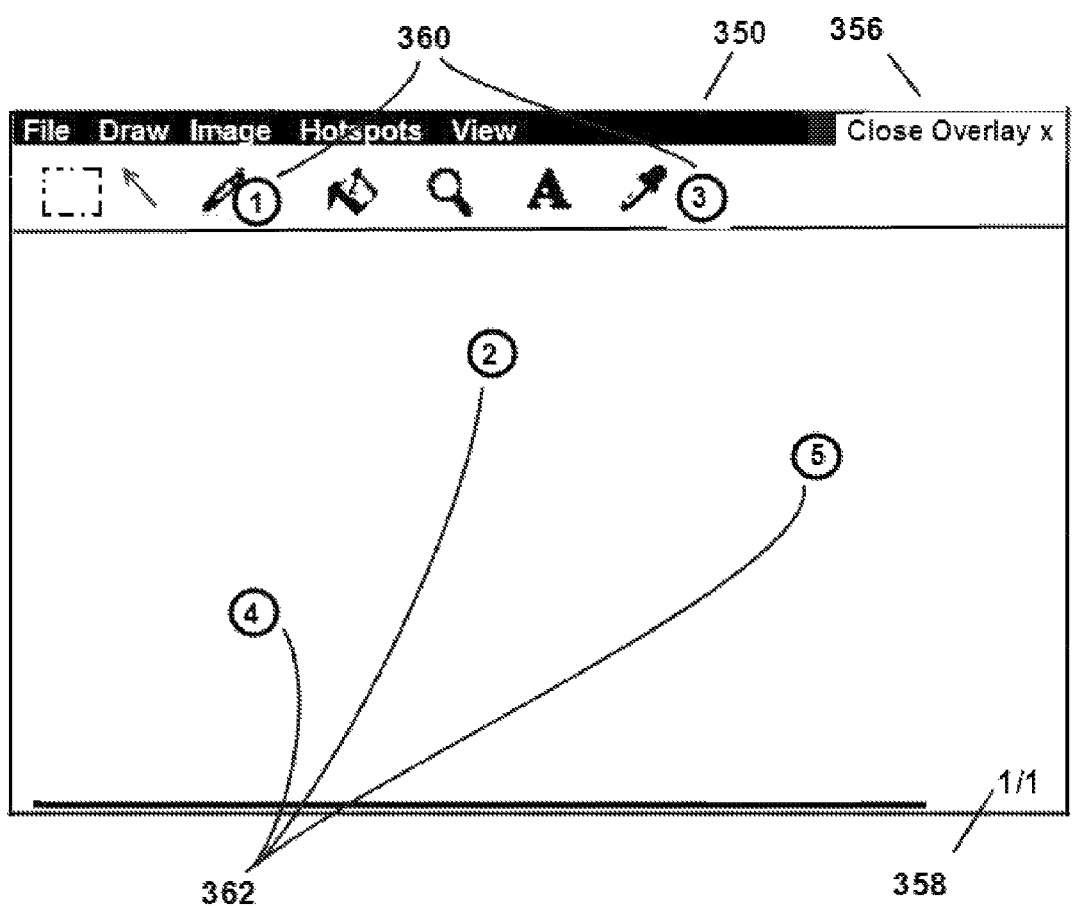
FIGS. 10-12 present screens of exemplary embodiments of transparent overlays provided with user-specified markers in accordance with the invention.

The system and methods in the present invention can work with any application and screen on a computing device. In one embodiment of the present system, a user of speech recognition issues a command, "Show Overlay" to activate the system's overlay. The present system can also be activated by other hands-free technologies or by keystroke. As shown in FIG. 10, the present system displays an overlay on the computer's active application. In this embodiment a transparent overlay is open over the active application 350. In this embodiment the overlay displays a "Close Overlay" text and graphical "x" in the upper right corner of the screen 356 to remind the user that the display controller is open and that it can be closed with the "Close Overlay" command. In this embodiment, the lower right corner displays the number of the overlay that is open, a forward slash and the number of overlays that have been configured for the active screen 358. Other identification systems can be used.

Once activated, the embodiment lets users create user-specified markers or indicators to identify user-specified screen positions that the user needs to or may wish to access. A user can create numbered buttons or other markers over controls 360 or any other screen location on the overlay by positioning the mouse over the desired location and/or by using speech recognition commands or other hands-free technologies to indicate where a marker is desired. A marker is created at the desired location once the user confirms the location through a hotkey, a speech recognition command or a command received through other hands-free technology. 362.

The size of the markers, their numbers, and their appearance in these drawings are configured to be clearly identifiable. However, the invention as disclosed herein is not so limited. The overlay's transparency can be customized by the user and can be configured to display a user definable grid, numbered buttons, icons or other markers superimposed on the GUI, highlighted areas, and/or to display desired text and graphics on the GUI. Further, the background color and the size of the numbers or other text displayed on the overlay are configurable by the user. The display of the markers can also be configured to intermittently enlarge the numbers of other text displayed, in order to make them clearly visible on even a computing devices with a small screen.

Figure 11:
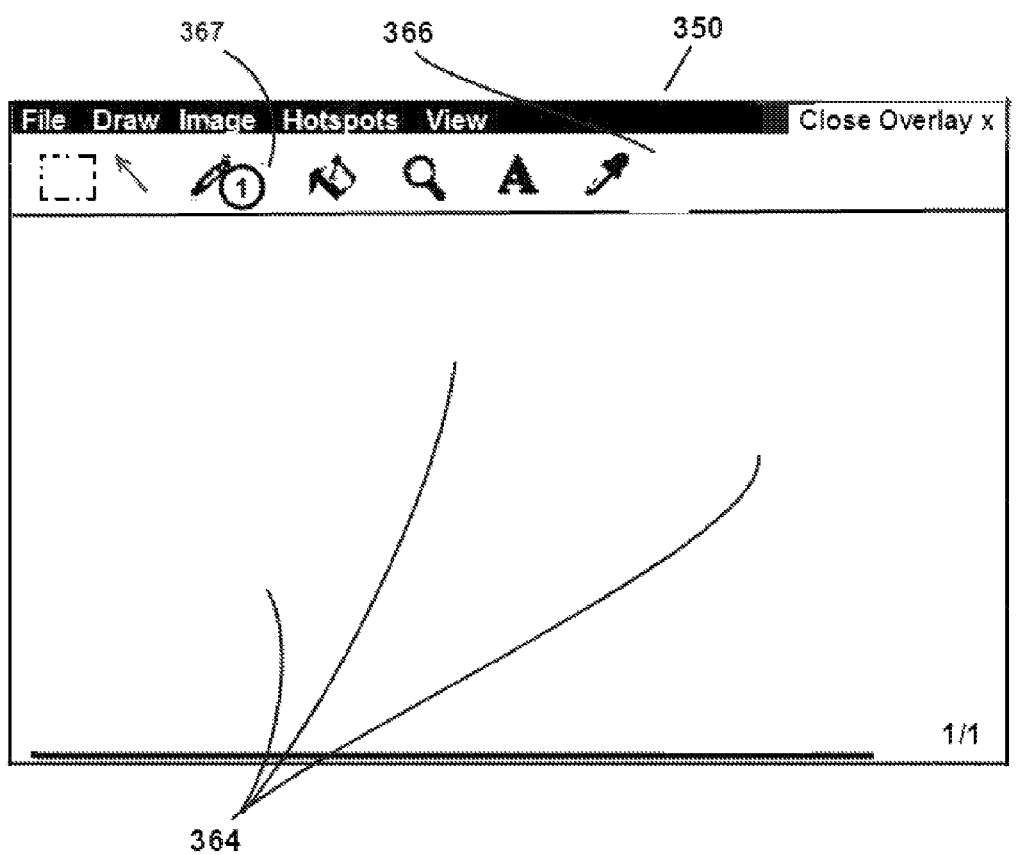

Referring to FIG. 11, the user issues an invention command "Delete 2 through 5" and the numbered markers 364-366 are deleted, leaving only marker 367. The present system includes a wide range of deletion commands. Further, markers can also be created, deleted and edited by editing the system's configuration files.

Figure 12:
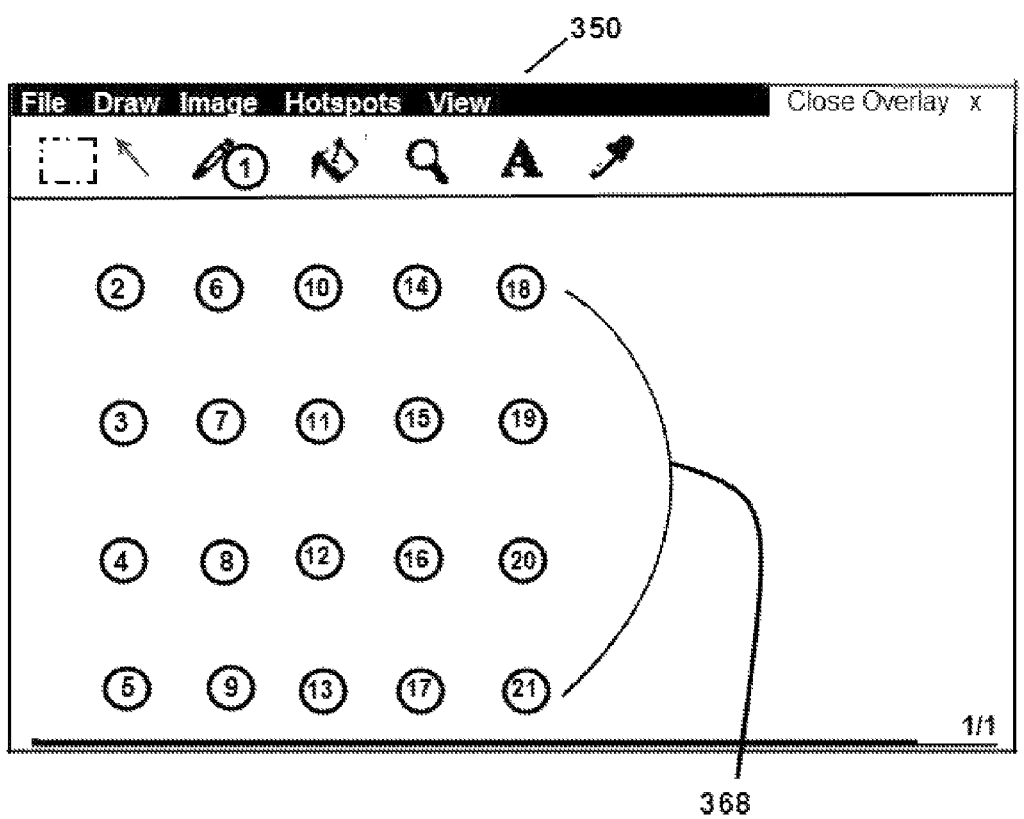

This embodiment includes a full range of commands to place a set of markers on its overlays in order make it easy for a user to create a set of markers to control an application or for a user to draw patterns, designs or diagrams in a drawing, CAD program or even a game. By way of example, a user of speech recognition issues a present invention's "Create a 4 by 5" table of markers' command. FIG. 12 shows a pattern of buttons 368 created by the command.

Figure 13:
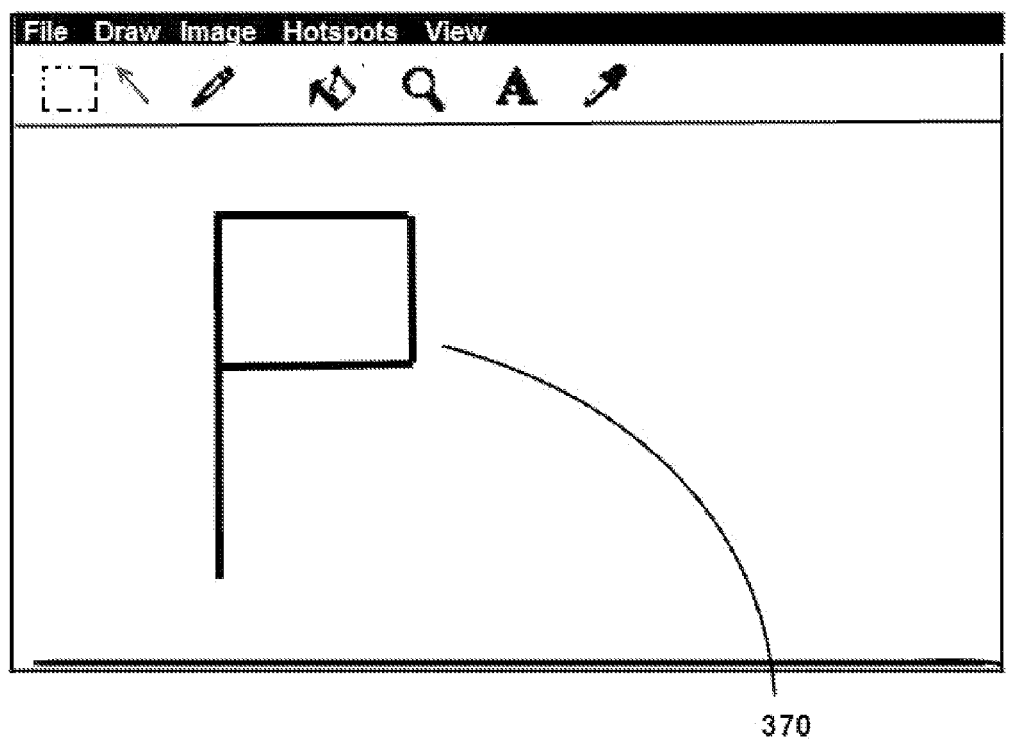
FIG. 13 presents a screen of an exemplary embodiment of a transparent overlay having a pattern drawn by the mouse-free system in accordance with the invention.

One aspect of the present invention lets users create columns or rows of markers with invention commands such as "Create Row", "Create Column", and "Create Column at 20 pixels" (this command creates a column of markers at the 'y' position of 20 pixels). The row and column commands let a user immediately access and control any menu in a vertical menu structure or any list element in a vertical list of elements. Using the invention's "drag" commands, a user can draw designs and diagrams between the markers on a canvas. The "drag" commands let a user drag an object from one marker to a second marker or to draw on a drawing program's canvas, using simple from complex commands. To illustrate this, a user issues a command, "Drag 9 to 6 to 14 to 15 to 7". FIG. 13 shows the pattern 370 that is drawn on the canvas. The invention includes a wide range of commands including "Alt Drag 14 to 8" and "Ctrl Drag 9 to 21", that will hold down the alt key, the ctrl key or others keys while the mouse is being dragged.

Figure 14:
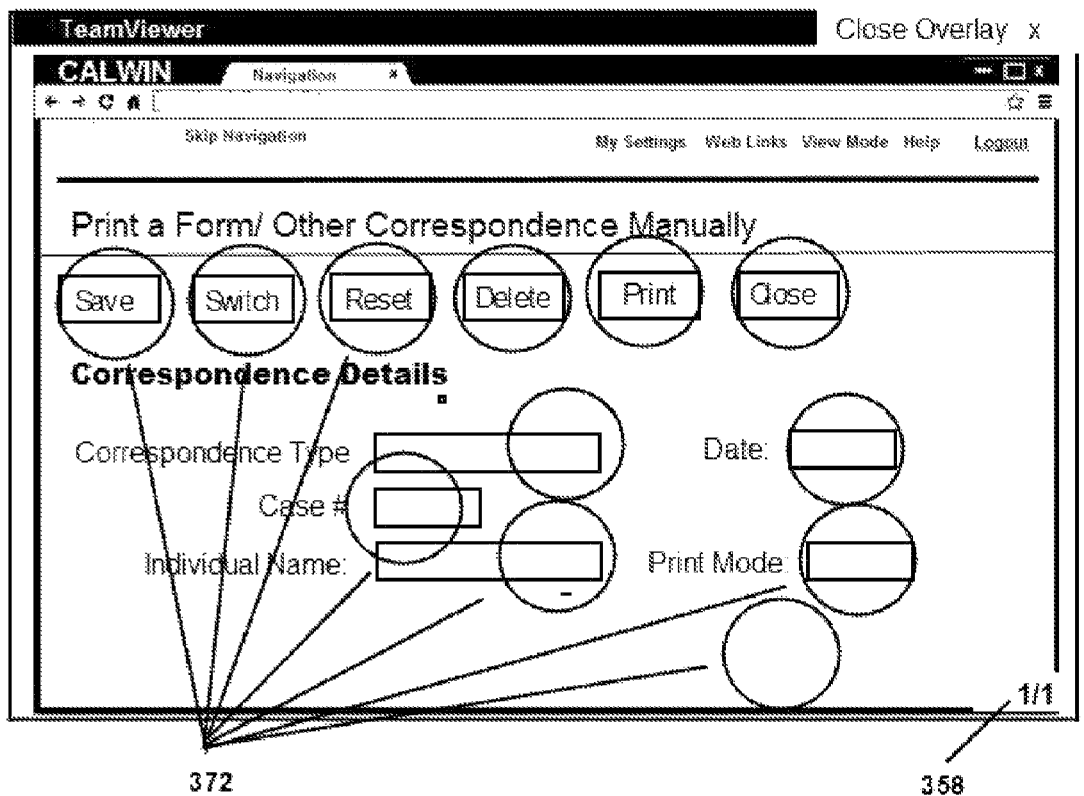
FIG. 14 presents a screen of an exemplary embodiment of a transparent overlay provided with large circles and usable with CALWIN and other inaccessible programs in accordance with the invention for use by Eye gaze Edge and other such technologies.

As shown in FIG. 14, in another embodiment of the present invention, a user of Eye gaze Edge or similar technology can open an overlay 358 and configure the present invention to draw large user-definable transparent or semi-transparent circles or other shapes 372 at any screen location on a graphical user interface, independent of the content of the screen display. When an Eye gaze Edge user clicks anywhere on a present invention's marker, the present system emulates a mouse click on the screen location defined by the user. The large size of the circles or other shapes makes them easy targets for users of Eye gaze Edge and similar technologies so that users can quickly and easily click on objects and other screen locations that they wish to access. Similarly, a user can configure the present invention to alternate between a display that does and does not increase the size of the markers. This embodiment would make the markers more legible on a small display screen.

Figure 15:
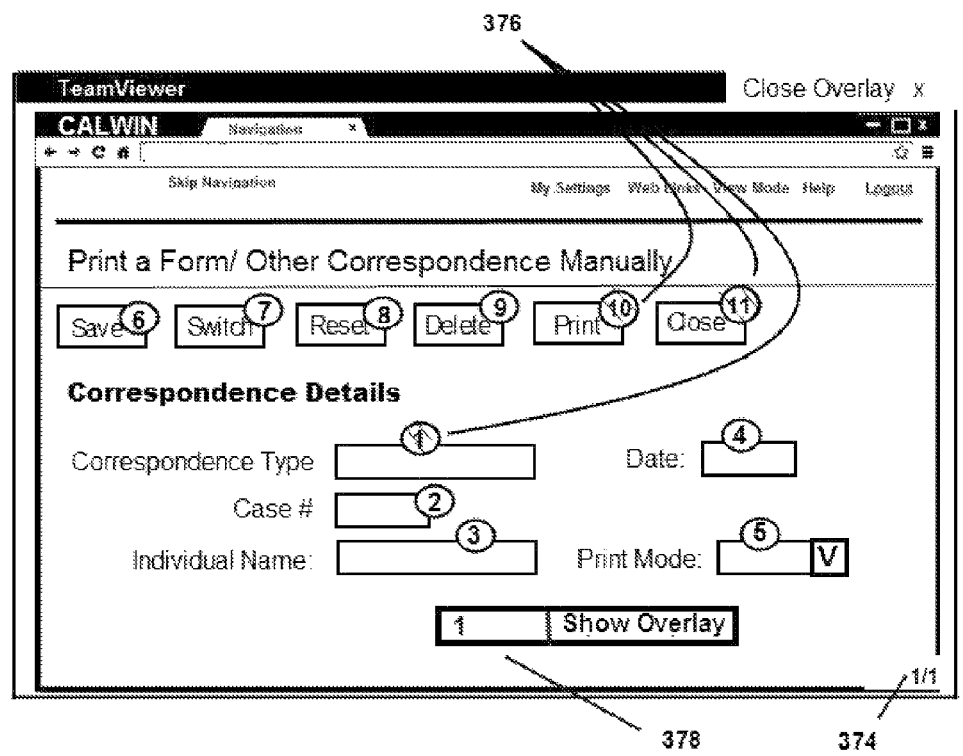
FIG. 15 presents a screen of an exemplary embodiment of a transparent overlay provided with a text box and usable with CALWIN and other inaccessible programs for keyboard input in accordance with the invention.

In another embodiment, a user can use a keyboard with the present system to emulate mouse clicks at predefined locations on their computer screens. Referring to FIG. 15, the user presses a pre-defined hot-key to open a present invention overlay 374. The overlay displays a text box 378 that lets the user type in the number or label of the desired marker. For example, when the user types a "1" into the text box 378, the present invention tracks the text as its being entered and highlights all markers or fields that contain the text 378 in the text entry box. To click on the screen location specified the text in the text entry box, the user just presses an enter key.

Figure 16:
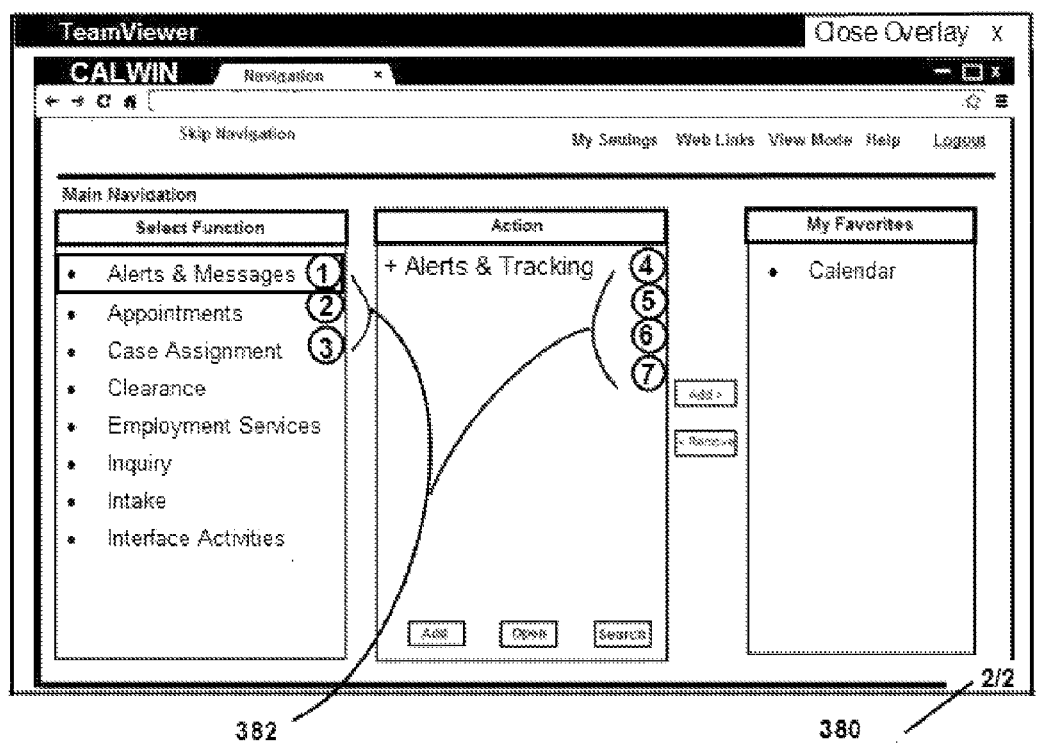
FIGS. 16-18 present screens of exemplary embodiments provided with markers and usable with CALWIN and other inaccessible programs in accordance with the invention.

The present invention lets a user create and customize one or more overlays for an executable file, a window name or a specific screen. If there is more than one overlay, the user can switch between overlays with the "Next Overlay" or "Previous Overlay" command or can open the desired overlay by saying the number of the overlay. For example, the "Overlay 2" command opens the second overlay 380 (2 of 2) for the CALWIN screen shown in FIG. 16. The ability to create just the buttons/markers at any screen location on a graphical user interface, independent of the content of the screen display, lets a user create simple overlays with only a few buttons/markers 382 that can be used for training and other purposes.

Figure 17:
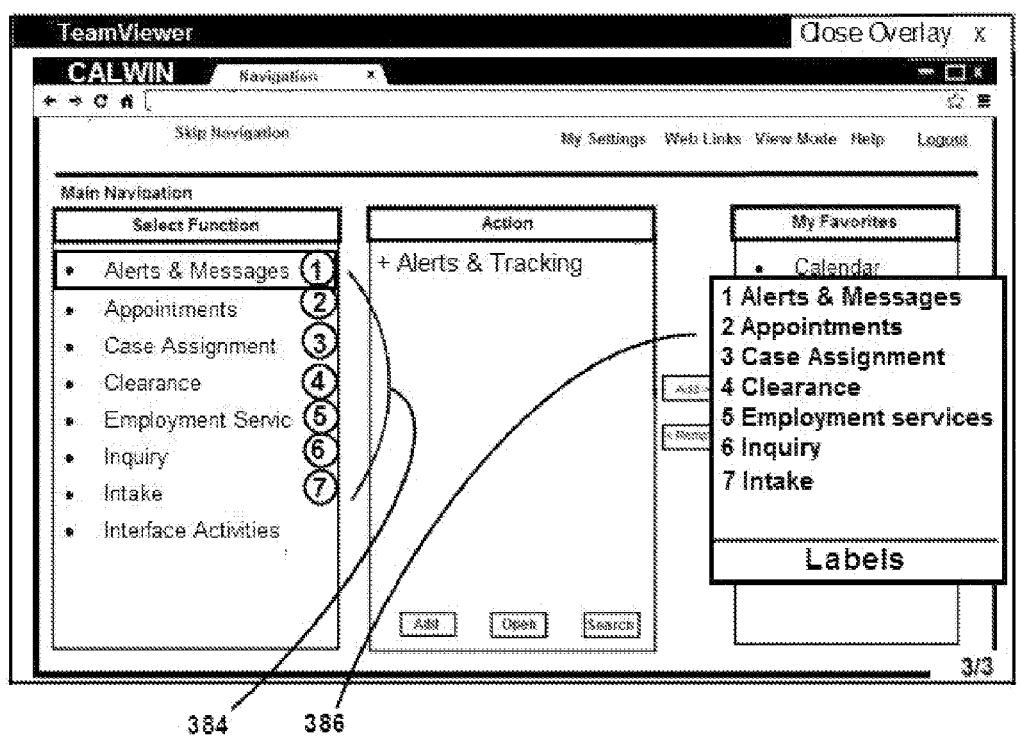

FIG. 17 illustrates an embodiment in which a user can create numbered markers at any screen location 384 and label the markers in a separate "Present invention Labels" window 386. When the overlay is accessed by a user of JAWS or other screen reader program, focus is given to the "Present invention Labels" window 386 and the window text is read by the screen reader instead of all the text on the application window thus simplifying an application's interface. The user can select the marker they wish to access, causing the invention to send an emulated mouse click to select the application feature or screen location associated with the marker.

Figure 18:
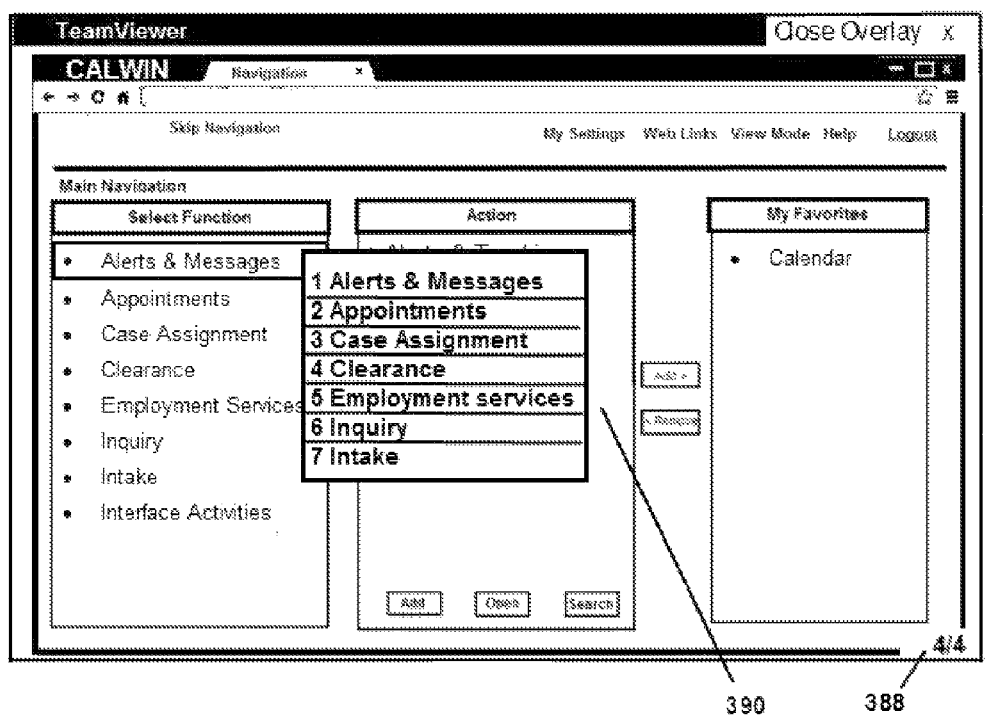

FIG. 18 illustrates an embodiment in which marker collections can be created 388 with labels to identify the screen locations 390. The overlays can be configured to automatically open when an application, window or screen is accessed by a user of switch access scanning technology, the scanning indicator would scan through each marked item systematically letting the user select the marker they wish to access, causing the invention to send an emulated mouse click to select the application feature or screen location associated with the marker.

Figure 19:
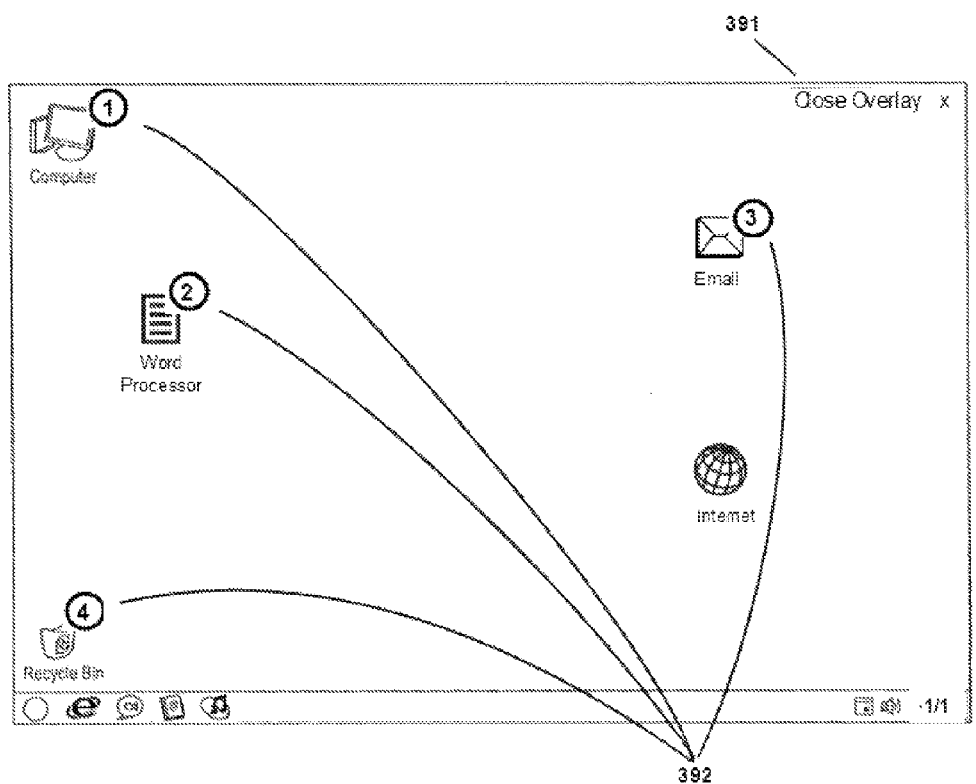
FIG. 19 presents a screen of an exemplary embodiment in which a marker collection is created for a computer desktop in accordance with the invention.

FIG. 19 illustrates an embodiment in which a marker collection is created for the entire desktop 391. The desktop can span one or more monitors. A user can create user-specified markers or indicators 392 to identify user-specified screen positions on the desktop and use invention commands to open applications, drag and drop files and applications on the desktop, and send mouse input, keyboard input, touch input, simultaneous mouse and keyboard input, and simultaneous touch and keyboard input to the computing device.

Figure 20:
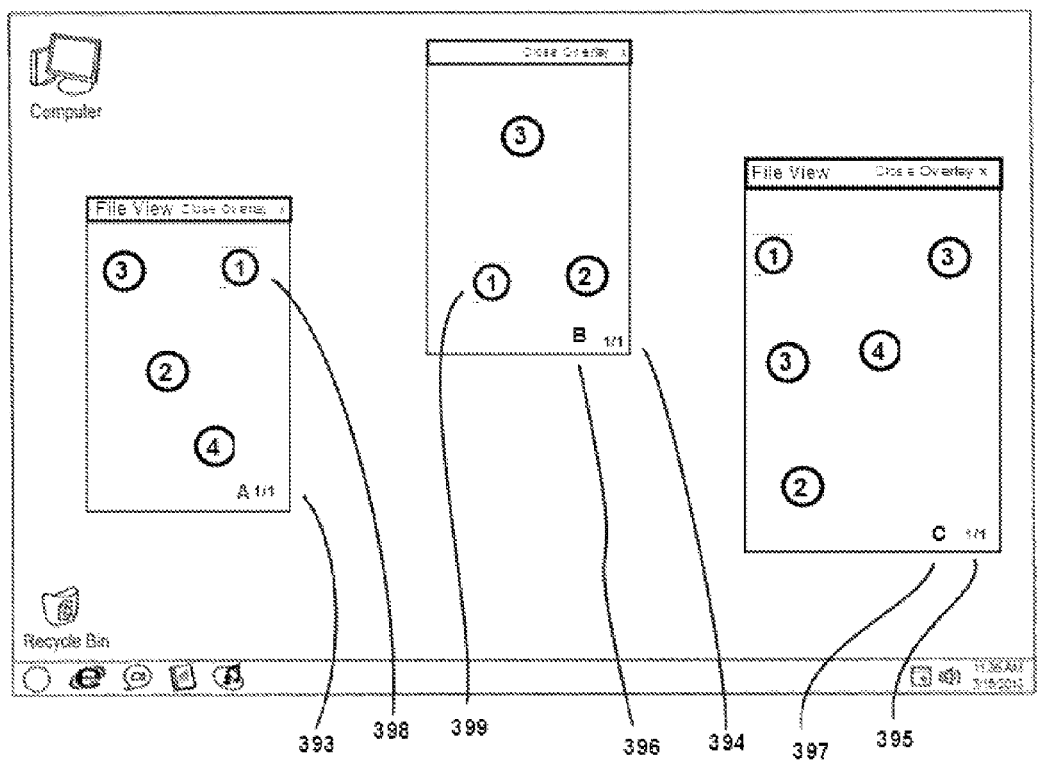
FIG. 20 presents a screen of an exemplary embodiment in which a user can open separate marker collections for each of several open applications in accordance with the invention.

FIG. 20 illustrates an embodiment that lets a user open separate marker collections 393, 394, and 395 for each of several applications open on the desktop or specified screen locations on the desktop. A user can create user-specified markers or indicators to identify user-specified screen positions on each of several marker collections 398 and 399. In one embodiment, the present invention markers the second and subsequent applications or a screen location with a letter, word or other unique label used to identify each application 396 and 397. In one embodiment, once configured, a user can issue a command to display a marker collection or a plurality of marker collections and send mouse input, keyboard input, touch input, simultaneous mouse and keyboard input, and simultaneous touch and keyboard input to a specified marker or a plurality of markers on the computing device by saying the letter as a prefix followed by the number of desired marker(s). For example, a user of speech recognition can issue a "Control click a2 b1 and c3" command to control click marker "2" in the marker collection "A" 396, marker "1" in the marker collection "B" and marker "3" in the marker collection "C". Thus, the present invention enables a user to send mouse input, keyboard input, touch input, simultaneous mouse and keyboard input, and simultaneous touch and keyboard input in each of several applications and screen locations without forcing the user to switch between applications and change focus in order to open menus follow links and perform other tasks.

The advantages of the present invention include, without limitation, systems and methods that enable a user to quickly and easily interact with all applications displayed on a computing device's output display even when the user cannot use the required input tools to interact with that displayed application. Interacting with devices on a computing display output typically involves using a mouse or touch input which are not always useable by people with disabilities. Further the present invention makes this simple and productive by creating an interface between an input methods a user can use, say speech recognition, and an input device the user cannot use, say a computer mouse, which is the only way many applications could previously be productively interacted with. The simplicity of the current invention has the advantage of requiring minimal training and being easy to use. The present invention can be used with any type of computer software, regardless of whether the software adheres to any accessibility guideline. Further, the present invention allows for multiple methods of interaction.

The present invention lets users get their work done by meeting user requirements that demand that a computer user must be able to quickly access and control anything and everything that a mouse can access and control. The present invention meets these requirements by providing simple, mouse-free systems and methods that create, display, manage and access markers on a computer display and are used by the invention to simulate computer input, such as mouse, mouse and keyboard, or other low level input, at the marked locations. Further, the present invention exceeds user requirements by providing systems and methods to form a unified application to deliver global, mouse-free access and control of a computer device's desktop and all applications, windows, menus, icons, text entry fields, buttons, checkboxes, drop-down lists and HTML links and all other objects on the computer desktop, While the invention has been described with reference to particular embodiments, this description is solely for the purpose of illustration and is not to be construed as limiting the scope of the invention claimed below. Various modifications may thus be made by those skilled in the art without departing from the true scope of the invention as defined in the appended claims.

I claim:

1. A system to facilitate a graphical user interface in a computing environment, the system comprising a computing device configured to execute computer code in order to:
   interact with a graphical user interface (GUI) in a window, the GUI comprising at least one user interface (UI) object accessible using a mouse;
   receive a first command from a user to position a mouse cursor at a location in the window of the UI object in preparation for receiving a second command from the user to generate a marker representing the UI object, wherein the marker comprises a marker label;
   receive the second command from the user;
   display the marker label proximate the location of the UI object in the window; and
   receive a voice command from the user that identifies the marker label, and in response to the voice command, generate an input representing the user interfacing with the UI object.

2. The system as recited in claim 1, wherein the first command is received by the user physically moving a mouse to position the mouse cursor.

3. The system as recited in claim 1, wherein the first command is received by a voice command from the user to position the mouse cursor.

4. The system as recited in claim 1, wherein the second command is received by a voice command from the user.

5. The system as recited in claim 1, wherein the second command is received by the user pressing a key on a keyboard.

6. The system as recited in claim 1, wherein the marker label comprises a number.

7. The system as recited in claim 1, wherein the computing device is further configured to execute computer code in order to:
   generate an overlay comprising a plurality of markers, wherein each marker comprises a marker label; and
   display the marker labels of the overlay in the window in response to receiving a third command from the user.

8. The system as recited in claim 1, wherein the UI object comprises at least one of a menu command, an icon command, an icon tool, a check box, and a text input field.

9. The system as recited in claim 1, wherein in response to the voice command the user interfacing with the UI object comprises emulating the user clicking a mouse cursor on the UI object.

10. A method of operating a system to facilitate a graphical user interface in a computing environment, the method comprising:
    interacting with a graphical user interface (GUI) in a window, the GUI comprising at least one user interface (UI) object accessible using a mouse;
    issuing a first command to position a mouse cursor at a location in the window of the UI object in preparation for issuing a second command to generate a marker representing the UI object, wherein the marker comprises a marker label;
    issuing the second command; and
    issuing a voice command that identifies the marker label in order to interface with the UI object.

11. The method as recited in claim 10, wherein the first command is issued by physically moving a mouse to position the mouse cursor.

12. The method as recited in claim 10, wherein the first command is issued by a voice command to position the mouse cursor.

13. The method as recited in claim 10, wherein the second command is issued by a voice command.

14. The method as recited in claim 10, wherein the second command is issued by pressing a key on a keyboard.

15. The method as recited in claim 10, wherein the marker label comprises a number.

16. The method as recited in claim 10, wherein the UI object comprises at least one of a menu command, an icon command, an icon tool, a check box, and a text input field.

17. The method as recited in claim 10, wherein interfacing with the UI object comprises emulating a user clicking a mouse cursor on the UI object.

18. A non-transient computer readable medium comprising computer code to facilitate a graphical user interface in a computing environment, the computer code being configured to:
    interact with a graphical user interface (GUI) in a window, the GUI comprising at least one user interface (UI) object accessible using a mouse;
    receive a first command from a user to position a mouse cursor at a location in the window of the UI object in preparation for receiving a second command from the user to generate a marker representing the UI object, wherein the marker comprises a marker label;
    receive the second command from the user;
    display the marker label proximate the location of the UI object in the window; and
    receive a voice command from the user that identifies the marker label, and in response to the voice command, generate an input representing the user interfacing with the UI object.

19. The non-transient computer readable medium as recited in claim 18, wherein the first command is received by the user physically moving a mouse to position the mouse cursor.

20. The non-transient computer readable medium as recited in claim 18, wherein the first command is received by a voice command from the user to position the mouse cursor.

* * * * *